(12) United States Patent
Yamada et al.

(10) Patent No.: US 11,136,745 B2
(45) Date of Patent: Oct. 5, 2021

(54) IMAGE PICK-UP APPARATUS, EARTH-MOVING MACHINE AND IMAGE PICK-UP SYSTEM

(71) Applicant: KOMATSU LTD., Tokyo (JP)

(72) Inventors: Takeo Yamada, Tokyo (JP);
Kenichirou Tanaka, Tokyo (JP);
Takafumi Katayama, Tokyo (JP);
Taiki Sugawara, Tokyo (JP); Shogo Atsumi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 648 days.

(21) Appl. No.: 15/758,074

(22) PCT Filed: Jun. 30, 2017

(86) PCT No.: PCT/JP2017/024204
§ 371 (c)(1),
(2) Date: Mar. 7, 2018

(87) PCT Pub. No.: WO2019/003431
PCT Pub. Date: Jan. 3, 2019

(65) Prior Publication Data
US 2020/0318322 A1    Oct. 8, 2020

(51) Int. Cl.
*E02F 9/26* (2006.01)
*E02F 3/32* (2006.01)
*G01C 3/08* (2006.01)
*G01C 3/14* (2006.01)
*H04N 5/225* (2006.01)
*H04N 5/232* (2006.01)
(Continued)

(52) U.S. Cl.
CPC ............ *E02F 9/26* (2013.01); *E02F 3/325* (2013.01); *G01C 3/08* (2013.01); *G01C 3/14* (2013.01); *H04N 5/2253* (2013.01); *H04N 5/232* (2013.01); *H04N 5/247* (2013.01); *H04N 7/181* (2013.01)

(58) Field of Classification Search
CPC .... E02F 9/20; E02F 9/22; E02F 3/655; G06T 19/006
See application file for complete search history.

(56) References Cited

U.S. PATENT DOCUMENTS 6,532,409 B1 * 3/2003 Fujishima ............. E02F 9/2045
701/50
8,948,981 B2 * 2/2015 Wei ........................ E02F 9/2045
701/50
(Continued)

FOREIGN PATENT DOCUMENTS

CN    201713843 U    1/2011
CN    105636659 A    6/2016
(Continued)

*Primary Examiner* — Luis Perez-Fuentes
(74) *Attorney, Agent, or Firm* — Faegre Drinker Biddle & Reath LLP

(57) ABSTRACT

A stereo camera provided in an earth-moving machine includes a first image pick-up portion and a second image pick-up portion. An optical axis of the first image pick-up portion and an optical axis of the second image pick-up portion are inclined away from a work implement at angles different from each other with respect to a central axis of the work implement in a plan view as a distance from a main body is greater.

4 Claims, 16 Drawing Sheets

(51) Int. Cl.
*H04N 5/247* (2006.01)
*H04N 7/18* (2006.01)

(56) References Cited

U.S. PATENT DOCUMENTS

| | | | |
|---|---|---|---|
| 9,256,227 B1* | 2/2016 | Wei | E02F 9/264 |
| 10,480,157 B2* | 11/2019 | Friend | E02F 9/2054 |
| 10,570,589 B2* | 2/2020 | Eidenberger | G01S 17/50 |
| 2013/0006484 A1* | 1/2013 | Avitzur | G05D 1/0274 |
| | | | 701/50 |
| 2016/0010312 A1* | 1/2016 | Kurihara | E02F 9/261 |
| | | | 701/36 |
| 2016/0265186 A1* | 9/2016 | Kami | E02F 3/435 |
| 2016/0273186 A1* | 9/2016 | Kami | E02F 9/2296 |
| 2017/0101761 A1* | 4/2017 | Wu | E02F 9/2292 |
| 2017/0120822 A1* | 5/2017 | Petzold | B60Q 1/00 |
| 2018/0058044 A1* | 3/2018 | Deguchi | H04N 7/181 |
| 2019/0360176 A1* | 11/2019 | Shimoda | E02F 9/261 |
| 2020/0318322 A1* | 10/2020 | Yamada | H04N 5/232 |

FOREIGN PATENT DOCUMENTS

| | | |
|---|---|---|
| JP | 2006-336328 A | 12/2006 |
| JP | 2007-64853 A | 3/2007 |
| JP | 2014-215039 A | 11/2014 |
| KR | 10-2008-0059792 A | 7/2008 |
| WO | WO-2017/056266 A1 | 4/2017 |
| WO | WO-2017/056268 A1 | 4/2017 |
| WO | WO-2017/061515 A1 | 4/2017 |

\* cited by examiner

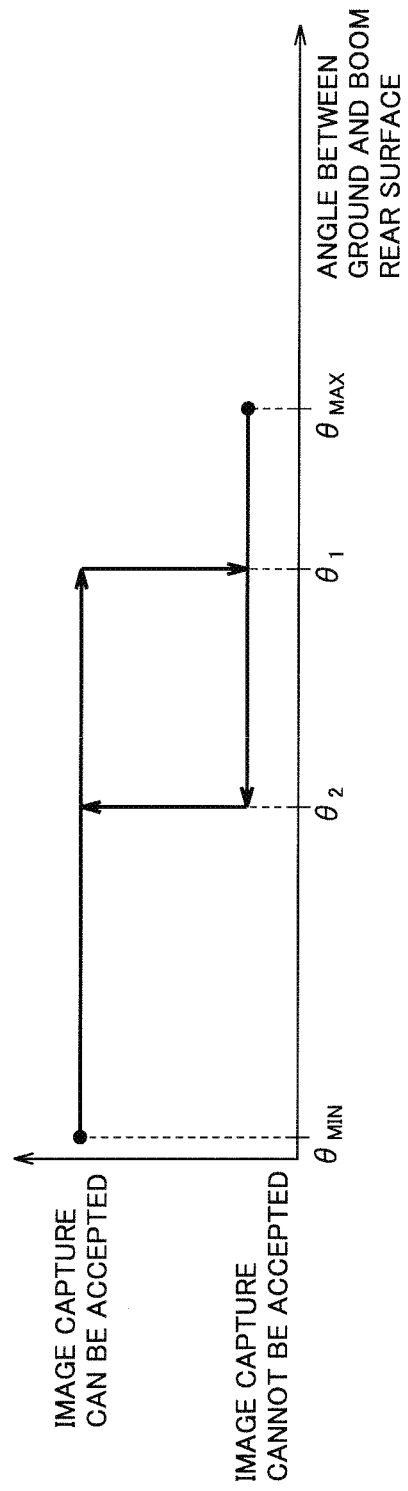

IMAGE PICK-UP APPARATUS, EARTH-MOVING MACHINE AND IMAGE PICK-UP SYSTEM

TECHNICAL FIELD

The present invention relates to an image pick-up apparatus, an earth-moving machine and an image pick-up system.

BACKGROUND ART

During work such as excavation or land grading by an earth-moving machine, existing topography varies with progress of the work. Therefore, existing topography data should be obtained in parallel to progress of the work. Measurement of a distance by a stereo camera is available as one of means for obtaining existing topography data.

In a work vehicle disclosed in International Publication No. WO2017/056268 (PTD 1), a stereo camera attached to a vehicular main body has a first image pick-up portion and a second image pick-up portion. An optical axis of the first image pick-up portion and an optical axis of the second image pick-up portion are inclined toward a work implement at angles different from each other with respect to a central axis of the work implement in a plan view as a distance from the vehicular main body is greater.

CITATION LIST

Patent Document

PTD 1: International Publication No. WO2017/056268

SUMMARY OF INVENTION

Technical Problem

The above-described document discloses a method for raising the work implement and moving the work implement out of an angle of view of the stereo camera before performing image pick-up by the stereo camera, because an existing topography cannot accurately be known when the work implement hides the existing topography.

The present inventor has found that the accuracy of image pick-up may be reduced when image pick-up by the stereo camera is performed with the work implement swung up to a high position.

Therefore, an object of the present invention is to provide a technique for accurately picking up an image of an existing topography to be worked.

Solution to Problem

An image pick-up apparatus according to the present invention is provided in an earth-moving machine. The earth-moving machine includes a main body, and a work implement attached to the main body, the work implement having a central axis in a plan view. The image pick-up apparatus includes a first image pick-up portion and a second image pick-up portion. An optical axis of the first image pick-up portion and an optical axis of the second image pick-up portion are inclined away from the work implement at angles different from each other with respect to the central axis in a plan view as a distance from the main body is greater.

An earth-moving machine according to the present invention includes: a main body; a work implement including a boom rotatably attached to the main body; an image pick-up apparatus attached to the main body; and a controller. The controller disallows image pick-up by the image pick-up apparatus, when an angle formed by the boom with respect to a ground where the earth-moving machine is located is not smaller than a predetermined first angle.

An image pick-up system according to the present invention includes an earth-moving machine and a controller. The earth-moving machine includes a main body, a work implement including a boom rotatably attached to the main body, and an image pick-up apparatus attached to the main body. The controller is configured to control operation of the earth-moving machine. The controller disallows image pick-up by the image pick-up apparatus, when an angle formed by the boom with respect to a ground where the earth-moving machine is located is not smaller than a predetermined first angle.

Advantageous Effects of Invention

According to the present invention, an image of an existing topography to be worked can accurately be picked up.

BRIEF DESCRIPTION OF DRAWINGS

FIG. 19 is a diagram showing a relation between an angle of the work implement with respect to the ground and whether or not image capture can be accepted.

DESCRIPTION OF EMBODIMENTS

Figure 1:
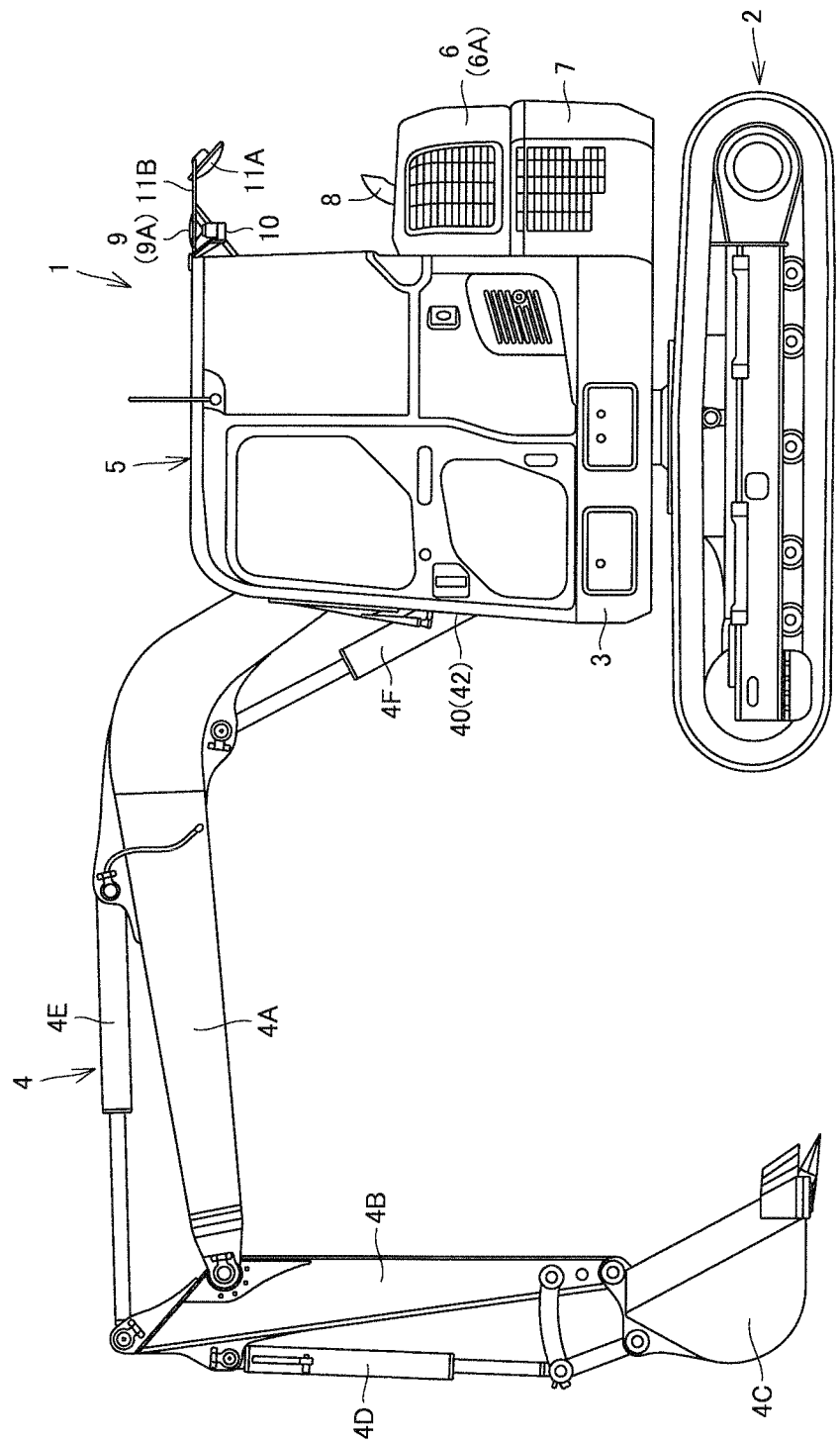
FIG. 1 is a side view schematically showing a construction of a hydraulic excavator based on an embodiment.

Embodiments will be described hereinafter with reference to the drawings. In the following description, the same components are designated by the same reference characters. Names and functions thereof are also the same. Therefore, the detailed description of them will not be repeated.

Although a hydraulic excavator 1 of small swing radius type will be described as one example of an earth-moving machine in the embodiments, the idea of the embodiments is also applicable to other types of earth-moving machines.

First Embodiment

Figure 2:
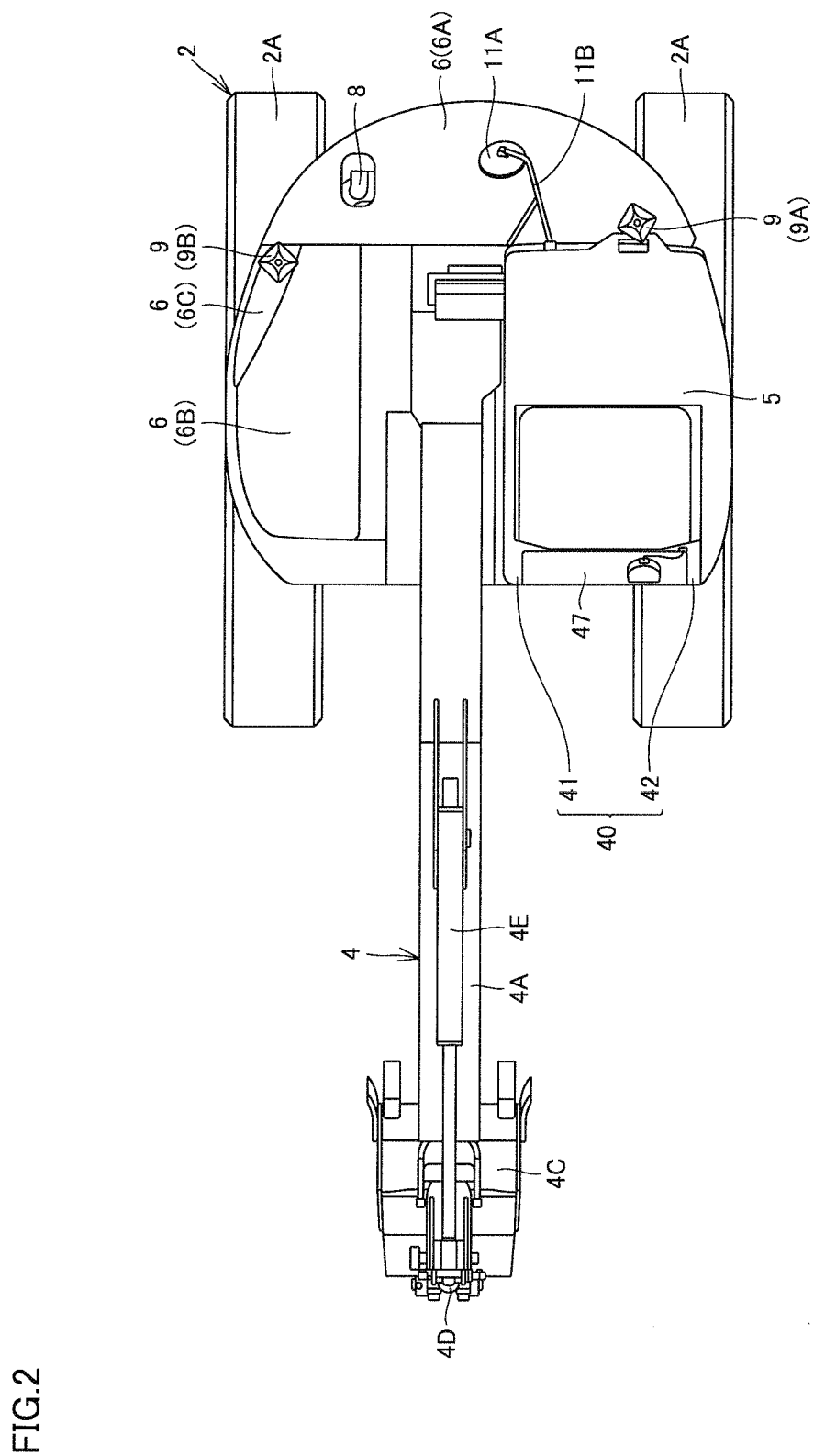
FIG. 2 is a plan view of the hydraulic excavator shown in FIG. 1.

FIG. 1 is a side view schematically showing a construction of hydraulic excavator 1 based on an embodiment. FIG. 2 is a plan view of hydraulic excavator 1 shown in FIG. 1. As shown in FIGS. 1 and 2, hydraulic excavator 1 in the present embodiment mainly has a travel unit 2, a revolving unit 3, and a work implement 4. A main body of hydraulic excavator 1 is constituted of travel unit 2 and revolving unit 3.

Travel unit 2 has a pair of left and right crawler belts 2A. Hydraulic excavator 1 is constructed to be self-propelled as the pair of left and right crawler belts 2A is rotationally driven. Revolving unit 3 is revolvably attached to travel unit 2. Revolving unit 3 mainly has a cab 5, an exterior cover 6, and a counterweight 7.

Cab 5 is arranged on a front left side of revolving unit 3 (a front side of the vehicle). An operator's compartment is formed inside cab 5. The operator's compartment is a space for an operator to operate hydraulic excavator 1. An operator's seat for an operator to have a seat is arranged in the operator's compartment.

In the present embodiment, positional relation among components will be described with work implement 4 being defined as the reference.

A boom 4A of work implement 4 rotationally moves around a boom pin with respect to revolving unit 3. A trajectory of movement of a specific portion of boom 4A which pivots with respect to revolving unit 3, such as a tip end portion of boom 4A, is in an arc shape, and a plane including the arc is specified. When hydraulic excavator 1 is planarly viewed, the plane is shown as a straight line. A direction in which this straight line extends is a fore/aft direction of the vehicular main body of the work vehicle or a fore/aft direction of revolving unit 3, and it is also simply referred to as the fore/aft direction below. A lateral direction (a direction of vehicle width) of the vehicular main body or a lateral direction of revolving unit 3 is a direction orthogonal to the fore/aft direction in a plan view and also simply referred to as the lateral direction below. The lateral direction refers to a direction of extension of the boom pin. An upward/downward direction of the vehicular main body or an upward/downward direction of revolving unit 3 is a direction orthogonal to the plane defined by the fore/aft direction and the lateral direction and also simply referred to as the upward/downward direction below.

A side in the fore/aft direction where work implement 4 projects from the vehicular main body is defined as the fore direction, and a direction opposite to the fore direction is defined as the aft direction. A right side and a left side in the lateral direction when one faces the fore direction are defined as a right direction and a left direction, respectively. A side in the upward/downward direction where the ground is located is defined as a lower side and a side where the sky is located is defined as an upper side.

The fore/aft direction refers to a fore/aft direction of an operator who sits at the operator's seat in cab 5. The lateral direction refers to a lateral direction of the operator who sits at the operator's seat. The upward/downward direction refers to an upward/downward direction of the operator who sits at the operator's seat. A direction in which the operator sitting at the operator's seat faces is defined as the fore direction and a direction behind the operator sitting at the operator's seat is defined as the aft direction. A right side and a left side at the time when the operator sitting at the operator's seat faces front are defined as the right direction and the left direction, respectively. A foot side of the operator who sits at the operator's seat is defined as a lower side, and a head side is defined as an upper side.

Exterior cover 6 has an engine hood 6A, a soil cover 6B and a sheet metal cover 6C. Engine hood 6A, soil cover 6B and sheet metal cover 6C form a part of an upper surface of revolving unit 3. Engine hood 6A and soil cover 6B are formed to be openable and closable. Engine hood 6A and soil cover 6B are formed of a lightweight resin material. Sheet metal cover 6C is formed to be immovable relative to revolving unit 3, and is formed of a metal material such as a steel material.

Engine hood 6A and counterweight 7 are arranged on a rear side of revolving unit 3 (a rear side of the vehicle). Engine hood 6A is arranged to cover an engine compartment from above and the rear. An engine unit (such as an engine and an exhaust gas treatment unit) is accommodated in the engine compartment. Engine hood 6A is provided with an opening formed by cutting a part of engine hood 6A. An exhaust pipe 8 for discharging the exhaust gas of the engine into the air projects above engine hood 6A through this opening.

Counterweight 7 is arranged in the rear of the engine compartment for keeping balance of the main body of hydraulic excavator 1 during excavation or the like. Hydraulic excavator 1 is formed as a hydraulic excavator of small swing radius type having a reduced swing radius. Therefore, a rear surface of counterweight 7 viewed planarly is formed in an arc shape centered at the swing center of revolving unit 3.

Soil cover 6B and sheet metal cover 6C are arranged on the right of revolving unit 3. Soil cover 6B and sheet metal cover 6C are provided on the right of work implement 4.

Work implement 4 serves for such work as excavation of soil. Work implement 4 is attached on the front side of revolving unit 3. Work implement 4 has, for example, boom 4A, an arm 4B, a bucket 4C, and hydraulic cylinders 4D, 4E, and 4F. Work implement 4 can be driven as boom 4A, arm 4B, and bucket 4C are driven by respective hydraulic cylinders 4F, 4E, and 4D.

A base end portion of boom 4A is coupled to revolving unit 3 with the boom pin being interposed. Boom 4A is attached to revolving unit 3 so as to be rotatable around the boom pin in both directions with respect to revolving unit 3. Boom 4A can be operated in the upward/downward direction. A base end portion of arm 4B is coupled to a tip end portion of boom 4A with an arm pin being interposed. Arm 4B is attached to boom 4A so as to be rotatable around the arm pin in both directions with respect to boom 4A. Bucket 4C is coupled to a tip end portion of arm 4B with a bucket pin being interposed. Bucket 4C is attached to arm 4B so as to be rotatable around the bucket pin in both directions with respect to arm 4B.

Work implement 4 is provided on the right of cab 5. Arrangement of cab 5 and work implement 4 is not limited to the example shown in FIGS. 1 and 2, and for example, work implement 4 may be provided on the left of cab 5 arranged on a front right side of revolving unit 3.

Cab 5 includes a roof portion arranged to cover the operator's seat and a plurality of pillars supporting the roof portion. Each pillar has a lower end coupled to a floor portion of cab 5 and an upper end coupled to the roof portion of cab 5. The plurality of pillars have a front pillar 40 and a rear pillar. Front pillar 40 is arranged in a corner portion of cab 5 in front of the operator's seat. The rear pillar is arranged in a corner portion of cab 5 in the rear of the operator's seat.

Front pillar 40 has a right pillar 41 and a left pillar 42. Right pillar 41 is arranged at the front right corner of cab 5. Left pillar 42 is arranged at the front left corner of cab 5. Work implement 4 is arranged on the right of cab 5. Right pillar 41 is arranged on a side close to work implement 4. Left pillar 42 is arranged on a side distant from work implement 4.

A space surrounded by right pillar 41, left pillar 42, and a pair of rear pillars provides an indoor space in cab 5. The operator's seat is accommodated in the indoor space in cab 5. A door for an operator to enter and exit from cab 5 is provided in a left side surface of cab 5.

A front window 47 is arranged between right pillar 41 and left pillar 42. Front window 47 is arranged in front of the operator's seat. Front window 47 is formed of a transparent material. An operator seated at the operator's seat can visually recognize the outside of cab 5 through front window 47. For example, the operator seated at the operator's seat can directly look at bucket 4C excavating soil and existing topography to be executed through front window 47.

A pair of antennas 9 are attached to revolving unit 3. The pair of antennas 9 are provided on the upper surface of revolving unit 3. The pair of antennas 9 have a main antenna 9A and a sub-antenna 9B. Main antenna 9A is attached to cab 5 with a bracket 10 being interposed. Main antenna 9A is arranged in the rear of cab 5. Sub-antenna 9B is provided above sheet metal cover 6C.

Main antenna 9A and sub-antenna 9B are spaced apart from each other in the lateral direction and arranged on the rear side of revolving unit 3. Of the pair of antennas 9, main antenna 9A is arranged on the left of revolving unit 3 and sub-antenna 9B is arranged on the right of revolving unit 3. Main antenna 9A and sub-antenna 9B are arranged at positions where main antenna 9A and sub-antenna 9B do not protrude from revolving unit 3 when viewed planarly.

A mirror 11A is attached to cab 5 with a stay 11B being interposed. Mirror 11A is arranged in the rear of cab 5.

Main antenna 9A and mirror 11A are arranged in the rear of a rear surface of cab 5. Main antenna 9A and mirror 11A are arranged below the roof portion of cab 5.

Figure 3:
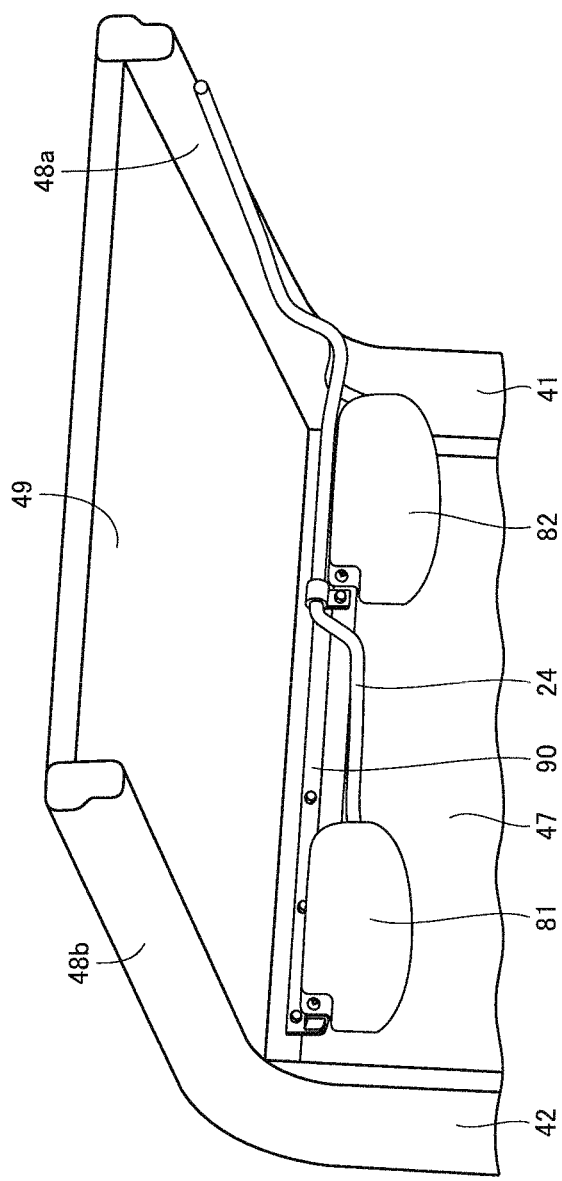
FIG. 3 is a perspective view showing a state that an upper front edge portion in a cab is viewed from the rear.

FIG. 3 is a perspective view showing a state that an upper front edge portion in cab 5 is viewed from the rear. An upper portion of right pillar 41 is continuous to a right roof beam 48a. An upper portion of left pillar 42 is continuous to a left roof beam 48b. Right roof beam 48a bridges the upper portion of right pillar 41 and an upper portion of the right rear pillar. Left roof beam 48b bridges the upper portion of left pillar 42 and an upper portion of the left rear pillar. A roof panel 49 is attached between right roof beam 48a and left roof beam 48b. Roof panel 49 forms the roof portion of cab 5.

A base portion 90 is arranged along an upper edge of front window 47. Base portion 90 is attached to an upper frame portion of front window 47. Base portion 90 extends in the lateral direction between right pillar 41 and left pillar 42. Base portion 90 is arranged along a front edge of roof panel 49.

A left case 81 is attached to base portion 90 in the vicinity of left pillar 42. A right case 82 is attached to base portion 90 in the vicinity of right pillar 41. Left case 81 and right case 82 are hollow. Left case 81 and right case 82 are arranged to project rearward from base portion 90.

A cable 24 is arranged along a direction in which base portion 90 extends. Cable 24 extends in the lateral direction along the upper edge of front window 47 and extends in the fore/aft direction along right roof beam 48a. Cable 24 is connected to an internal space in left case 81 and to an internal space in right case 82. Cable 24 is supported by base portion 90.

Figure 4:
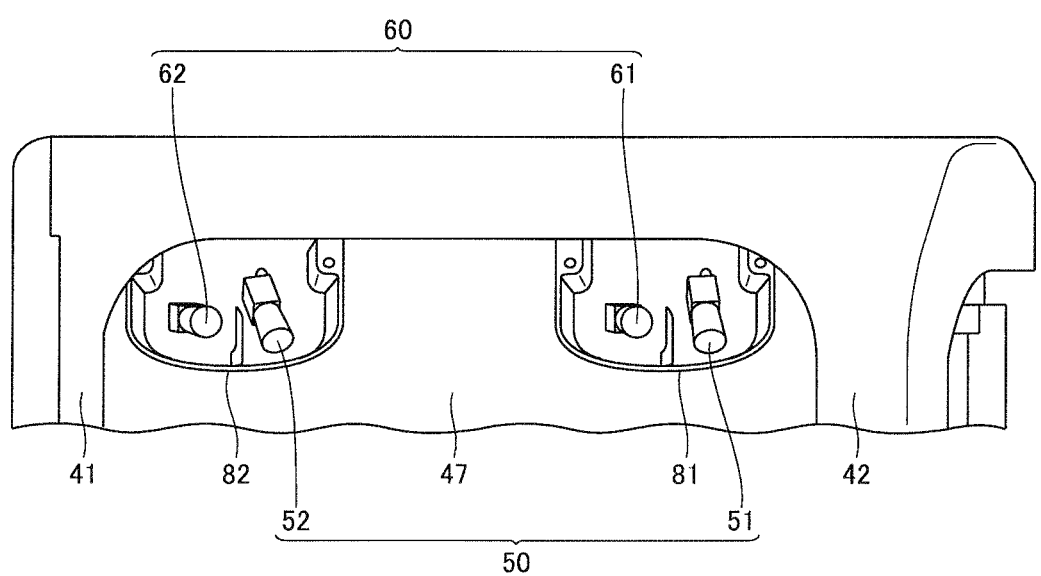
FIG. 4 is a front view of an upper edge portion of the cab viewed from outside the cab.

FIG. 4 is a front view of an upper edge portion of cab 5 viewed from outside cab 5. Hollow left case 81 and right case 82 are open toward the front. Therefore, a first image pick-up portion 51 and a third image pick-up portion 61 accommodated in left case 81 and a second image pick-up portion 52 and a fourth image pick-up portion 62 accommodated in right case 82 are shown in FIG. 4 showing the upper edge portion of cab 5 viewed from the front.

First image pick-up portion 51 and second image pick-up portion 52 are in synchronization with each other and implement a first stereo camera 50. First stereo camera 50 includes first image pick-up portion 51 and second image pick-up portion 52. First stereo camera 50 is an image pick-up apparatus for picking up an image of a front region in front of hydraulic excavator 1. First stereo camera 50 can pick up an image, for example, of an existing topography in front of hydraulic excavator 1. First image pick-up portion 51 is arranged on the left of second image pick-up portion 52 in the lateral direction. Second image pick-up portion 52 is arranged on the right of first image pick-up portion 51 in the lateral direction.

Third image pick-up portion 61 and fourth image pick-up portion 62 are in synchronization with each other and implement a second stereo camera 60. Second stereo camera 60 includes third image pick-up portion 61 and fourth image pick-up portion 62. Second stereo camera 60 is an image pick-up apparatus for picking up an image of the front region in front of hydraulic excavator 1. Second stereo camera 60 can pick up an image, for example, of an existing topography in front of hydraulic excavator 1. Third image pick-up portion 61 is arranged on the left of fourth image pick-up portion 62 in the lateral direction. Fourth image pick-up portion 62 is arranged on the right of third image pick-up portion 61 in the lateral direction.

First stereo camera 50 and second stereo camera 60 are arranged as being aligned in the lateral direction. First image pick-up portion 51, second image pick-up portion 52, third image pick-up portion 61, and fourth image pick-up portion 62 are arranged as being aligned in the lateral direction. First image pick-up portion 51, third image pick-up portion 61, second image pick-up portion 52, and fourth image pick-up portion 62 are arranged sequentially from the left to the right in the lateral direction. First image pick-up portion 51, second image pick-up portion 52, third image pick-up portion 61, and fourth image pick-up portion 62 are implemented by identical apparatuses.

An interval between third image pick-up portion 61 and second image pick-up portion 52 in the lateral direction is greater than an interval between first image pick-up portion 51 and third image pick-up portion 61 in the lateral direction. The interval between third image pick-up portion 61 and second image pick-up portion 52 in the lateral direction is greater than an interval between second image pick-up portion 52 and fourth image pick-up portion 62 in the lateral direction. An interval between first image pick-up portion 51 and second image pick-up portion 52 in the lateral direction is equal to an interval between third image pick-up portion 61 and fourth image pick-up portion 62 in the lateral direction.

First stereo camera 50 and second stereo camera 60 are arranged in cab 5 along the upper edge of front window 47. First image pick-up portion 51, second image pick-up portion 52, third image pick-up portion 61, and fourth image pick-up portion 62 are arranged in cab 5 along the upper edge of front window 47 so as to face front window 47.

First stereo camera 50 and second stereo camera 60 are arranged at the same positions in the upward/downward direction. First image pick-up portion 51 and second image pick-up portion 52 of first stereo camera 50 are arranged at the same height. Third image pick-up portion 61 and fourth image pick-up portion 62 of second stereo camera 60 are arranged at the same height. First image pick-up portion 51, second image pick-up portion 52, third image pick-up portion 61, and fourth image pick-up portion 62 are arranged at the same positions in the upward/downward direction.

First image pick-up portion 51 and third image pick-up portion 61 constitute a left image pick-up portion group. Second image pick-up portion 52 and fourth image pick-up portion 62 constitute a right image pick-up portion group. The left image pick-up portion group is accommodated in left case 81. The right image pick-up portion group is accommodated in right case 82. The left image pick-up portion group and the right image pick-up portion group are arranged at a distance from each other in the lateral direction.

The left image pick-up portion group is arranged in the vicinity of left pillar 42. A distance between the center of cab 5 and the left image pick-up portion group in the lateral direction is greater than a distance between left pillar 42 and the left image pick-up portion group. The left image pick-up portion group is arranged as being closer to left pillar 42 than to the center of cab 5 in the lateral direction. When a region between the center of cab 5 and left pillar 42 in the lateral direction is virtually divided into two sections in the lateral direction, the left image pick-up portion group is arranged in a region close to left pillar 42 of the two divided regions. The left image pick-up portion group is arranged as being near left pillar 42.

The right image pick-up portion group is arranged in the vicinity of right pillar 41. A distance between the center of cab 5 and the right image pick-up portion group in the lateral direction is greater than a distance between right pillar 41 and the right image pick-up portion group. The right image pick-up portion group is arranged as being closer to right pillar 41 than to the center of cab 5 in the lateral direction. When a region between the center of cab 5 and right pillar 41 in the lateral direction is virtually divided into two sections in the lateral direction, the right image pick-up portion group is arranged in a region closer to right pillar 41 of the two divided regions. The right image pick-up portion group is arranged as being near right pillar 41.

Each image pick-up portion includes an optical processing unit, a light reception processing unit, and an image processing unit. The optical processing unit has a lens for condensing light. An optical axis of the image pick-up portion which will be described later refers to an axis which passes through the center of a lens surface and is perpendicular to the lens surface. The light reception processing unit has an image pick-up element. The image pick-up element is implemented, for example, by a CMOS (Complementary Metal Oxide Semiconductor) image sensor. The image pick-up element has a light reception surface. The light reception surface is a surface orthogonal to the optical axis. The light reception surface is flat and rectangular and arranged as being vertically long. The image pick-up portion is arranged such that a long side (a longitudinal side) of the light reception surface of the image pick-up element extends along a vertical direction.

Figure 5:
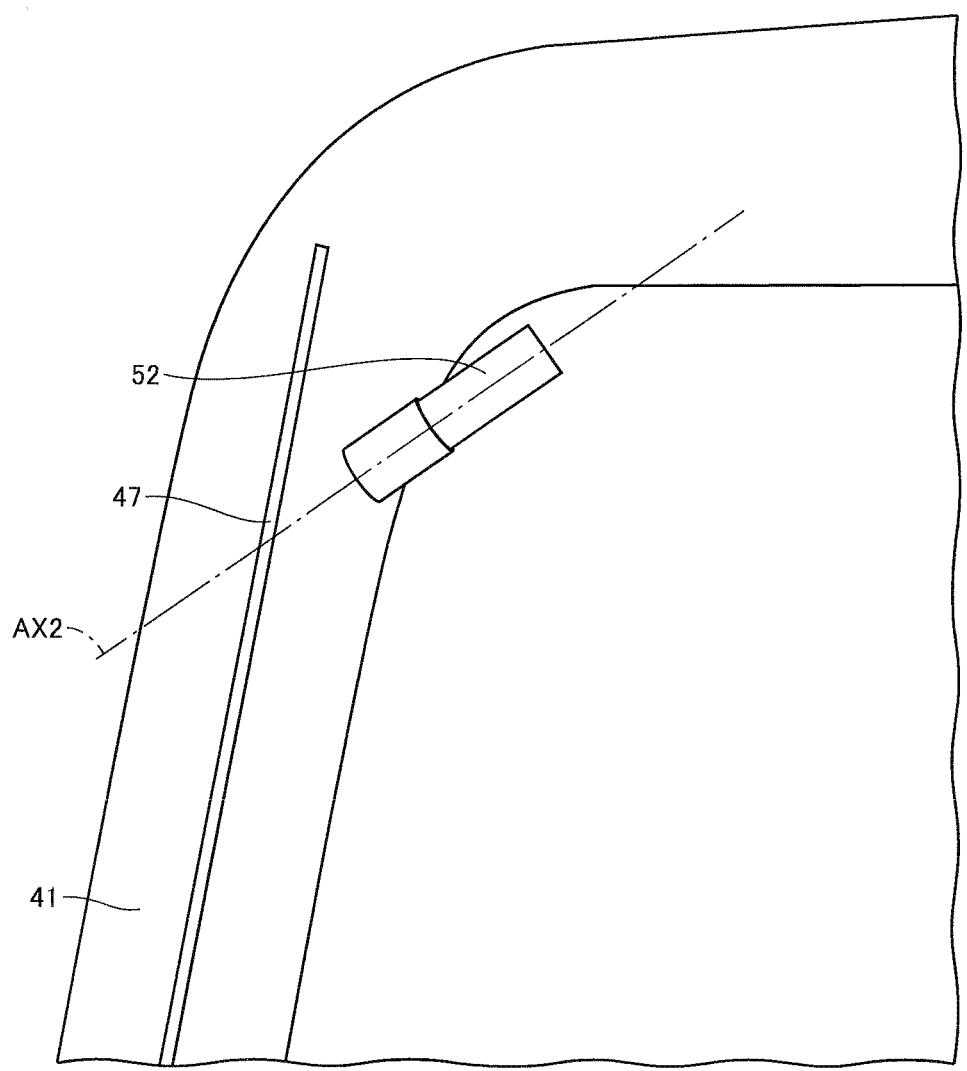
FIG. 5 is a schematic diagram of an image pick-up portion of a first stereo camera viewed from a side.

FIG. 5 is a schematic diagram of the image pick-up portion of first stereo camera 50 viewed from a side. The left side in FIG. 5 refers to a front side of revolving unit 3, the right side in FIG. 5 refers to a rear side of revolving unit 3, an upper side in FIG. 5 refers to an upper side of revolving unit 3, and a lower side in FIG. 5 refers to a lower side of revolving unit 3. The lateral direction in FIG. 5 refers to the fore/aft direction of revolving unit 3 and the upward/downward direction in FIG. 5 refers to the upward/downward direction of revolving unit 3. FIG. 5 shows only second image pick-up portion 52 of the image pick-up portions constituting first stereo camera 50. An optical axis AX2 shown with a chain dotted line in FIG. 5 indicates an optical axis of second image pick-up portion 52.

As shown in FIG. 5, second image pick-up portion 52 is arranged to face front window 47. Second image pick-up portion 52 is arranged at an angle looking down toward the front of cab 5. Optical axis AX2 of second image pick-up portion 52 forms a downward angle from a horizontal direction, in front of cab 5. Optical axis AX2 is inclined at an angle of depression with respect to the horizontal direction, in front of the vehicular main body.

Though FIG. 5 representatively shows second image pick-up portion 52 of the image pick-up portions constituting first stereo camera 50, first image pick-up portion 51 is arranged at a position the same as second image pick-up portion 52 in the side view. In the side view, an optical axis of first image pick-up portion 51 extends in a direction the same as optical axis AX2 of second image pick-up portion 52 shown in FIG. 5. The optical axis of first image pick-up portion 51 is inclined at an angle of depression with respect to the horizontal direction, in front of the vehicular main body.

Figure 6:
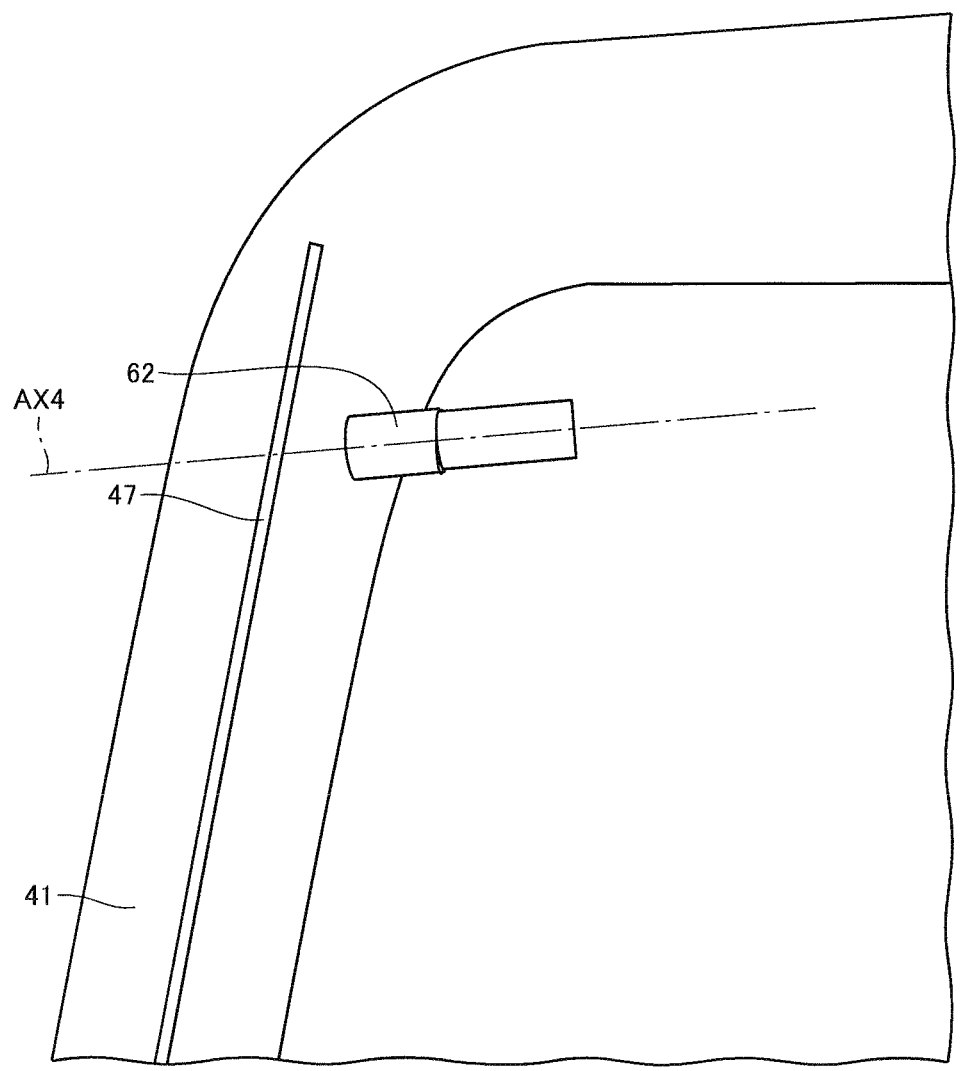
FIG. 6 is a schematic diagram of an image pick-up portion of a second stereo camera viewed from the side.

FIG. 6 is a schematic diagram of the image pick-up portion of second stereo camera 60 viewed from the side. FIG. 6 shows fourth image pick-up portion 62 of second stereo camera 60 instead of second image pick-up portion 52 shown in FIG. 5. FIG. 6 shows only fourth image pick-up portion 62 of the image pick-up portions constituting second stereo camera 60. An optical axis AX4 shown with a chain dotted line in FIG. 6 indicates an optical axis of fourth image pick-up portion 62.

As shown in FIG. 6, fourth image pick-up portion 62 is arranged to face front window 47. Fourth image pick-up portion 62 is arranged at an angle slightly looking down toward the front of cab 5. Optical axis AX4 of fourth image pick-up portion 62 forms a downward angle from the horizontal direction, in front of cab 5. Optical axis AX4 is inclined at an angle of depression with respect to the horizontal direction, in front of the vehicular main body.

Though FIG. 6 representatively shows fourth image pick-up portion 62 of the image pick-up portions constituting second stereo camera 60, third image pick-up portion 61 is arranged at a position the same as fourth image pick-up portion 62 in the side view. In the side view, an optical axis of third image pick-up portion 61 extends in a direction the same as optical axis AX4 of fourth image pick-up portion 62 shown in FIG. 6. The optical axis of third image pick-up portion 61 is inclined at an angle of depression with respect to the horizontal direction, in front of the vehicular main body.

Based on comparison between FIGS. 5 and 6, the optical axis of first stereo camera 50 (matching with the optical axis of first image pick-up portion 51 and optical axis AX2 of second image pick-up portion 52 in the side views shown in FIGS. 5 and 6) is inclined at a greater angle with respect to the horizontal direction than the optical axis of second stereo camera 60 (matching with the optical axis of third image pick-up portion 61 and optical axis AX4 of fourth image pick-up portion 62 in the side views shown in FIGS. 5 and 6). The angle of depression of the optical axis of first stereo camera 50 is greater than the angle of depression of the optical axis of second stereo camera 60.

Figure 7:
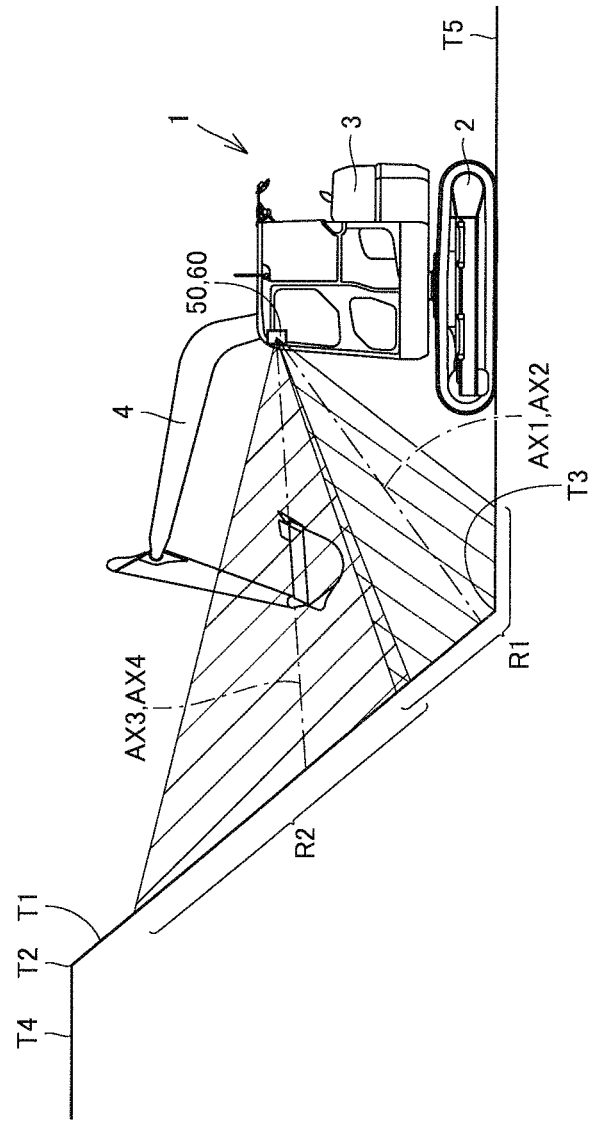
FIG. 7 is a schematic diagram showing a range of image pick-up by the stereo camera when viewed laterally.

FIG. 7 is a schematic diagram showing a range R1 of image pick-up by first stereo camera 50 and a range R2 of image pick-up by second stereo camera 60 viewed from the side. As described above, first stereo camera 50 and second stereo camera 60 are arranged in an upper front portion in cab 5. First stereo camera 50 and second stereo camera 60 are arranged at the same positions in the upward/downward direction. As shown in FIG. 7, first stereo camera 50 and second stereo camera 60 overlap each other in the side view. First image pick-up portion 51, second image pick-up portion 52, third image pick-up portion 61, and fourth image pick-up portion 62 are arranged at positions overlapping one another in the side view.

Optical axis AX2 shown in FIG. 7 indicates the optical axis of second image pick-up portion 52 described with reference to FIG. 5. An optical axis AX1 represents the optical axis of first image pick-up portion 51 and extends in a direction the same as optical axis AX2 in the side view shown in FIG. 7. Optical axis AX4 shown in FIG. 7 indicates the optical axis of fourth image pick-up portion 62 described with reference to FIG. 6. An optical axis AX3 represents the optical axis of third image pick-up portion 61 and extends in a direction the same as optical axis AX4 in the side view shown in FIG. 7.

Hydraulic excavator 1 shown in FIG. 7 performs work of a slope T1 with work implement 4. Slope T1 is the ground inclined with respect to the upward/downward direction between upper ground T4 and lower ground T5. A top of slope T2 refers to an uppermost end of slope T1. A toe of slope T3 refers to a lowermost end of slope T1. Top of slope T2 defines a boundary between slope T1 and upper ground T4. Toe of slope T3 defines a boundary between slope T1 and lower ground T5.

A range hatched with diagonal lines extending from upper right toward lower left in FIG. 7 represents a range within an angle of view in a vertical plane of first stereo camera 50 mounted on hydraulic excavator 1 located on a horizontal plane. First stereo camera 50 picks up an image of topography included in that angle of view. Image pick-up range R1 shown in FIG. 7 represents a first image pick-up range in the vertical plane of which image is picked up by first stereo camera 50. Image pick-up range R1 includes a part of lower ground T5, toe of slope T3, and a part of slope T1.

A range hatched with diagonal lines extending from upper left toward lower right in FIG. 7 represents a range within an angle of view in a vertical plane of second stereo camera 60 mounted on hydraulic excavator 1 located on the horizontal plane. Second stereo camera 60 picks up an image of topography included in that angle of view. Image pick-up range R2 shown in FIG. 7 represents a second image pick-up range in the vertical plane of which image is picked up by second stereo camera 60. Image pick-up range R2 includes a part of slope T1.

An angle of depression of the optical axis of first stereo camera 50 (matching with optical axis AX1 of first image pick-up portion 51 and optical axis AX2 of second image pick-up portion 52 in the side view shown in FIG. 7) is greater than an angle of depression of the optical axis of second stereo camera 60 (matching with optical axis AX3 of third image pick-up portion 61 and optical axis AX4 of fourth image pick-up portion 62 in the side view shown in FIG. 7). Therefore, first stereo camera 50 picks up an image of image pick-up range R1 relatively below. Second stereo camera 60 picks up an image of image pick-up range R2 relatively above. Second stereo camera 60 picks up an image of image pick-up range R2 above image pick-up range R1 of which image is picked up by first stereo camera 50.

Image pick-up range R1 overlaps image pick-up range R2. An upper edge portion of image pick-up range R1 and a lower edge portion of image pick-up range R2 overlap each other. An angle of view of first stereo camera 50 and an angle of view of second stereo camera 60 partially overlap with each other. Angles of view of first image pick-up portion 51, second image pick-up portion 52, third image pick-up portion 61, and fourth image pick-up portion 62 partially overlap with one another. A lower edge of image pick-up range R1 and an upper edge of image pick-up range R2 form an angle of approximately 90 degrees (an angle smaller than 90 degrees is shown in FIG. 7 for ease in viewing of the figure).

Figure 8:
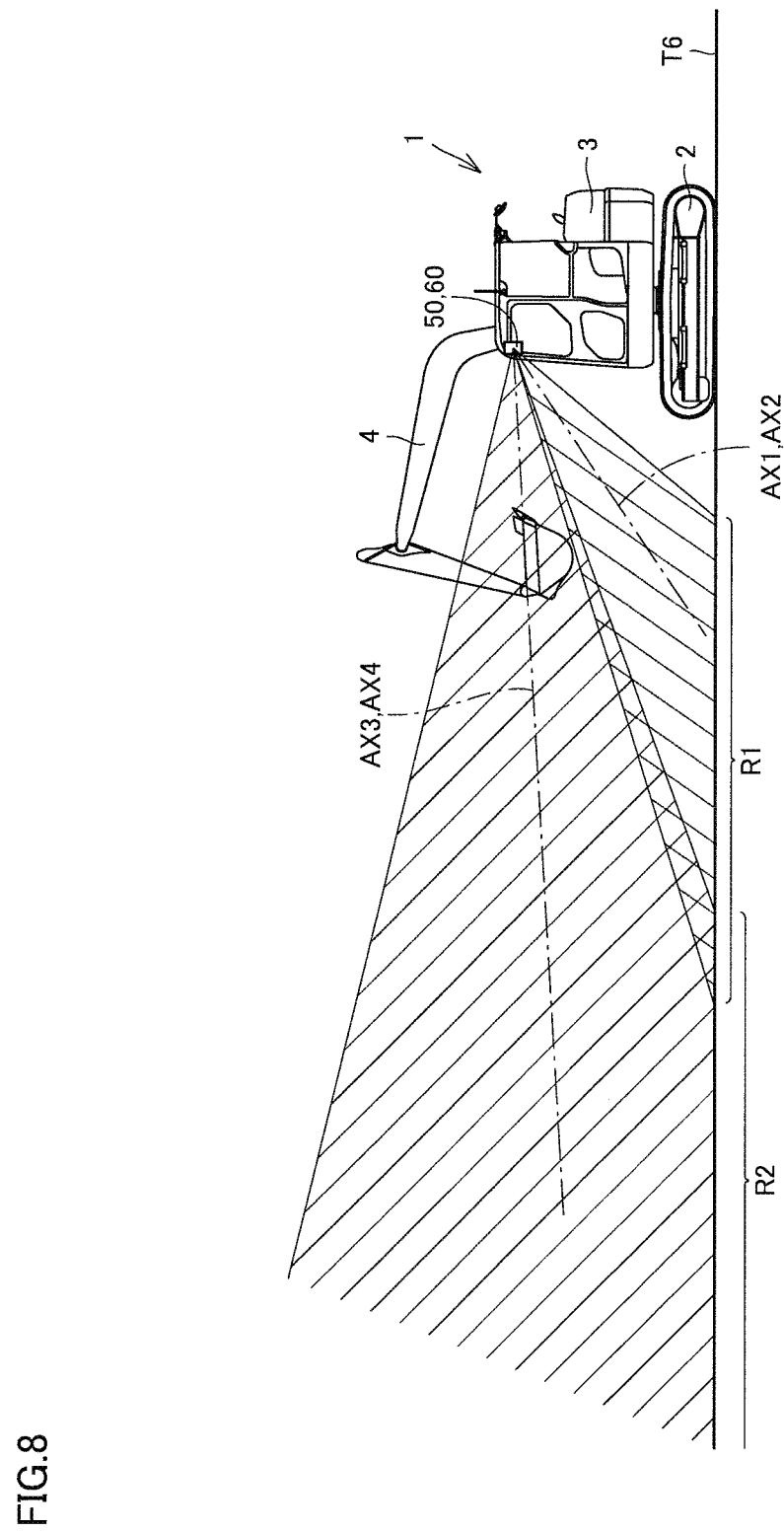
FIG. 8 is a schematic diagram showing a range of image pick-up by the stereo camera when viewed laterally.

FIG. 8 is a schematic diagram showing range R1 of image pick-up by first stereo camera 50 in the vertical plane and range R2 of image pick-up by second stereo camera 60 in the vertical plane viewed from the side, similarly to FIG. 7. Hydraulic excavator 1 shown in FIG. 8 performs work of a plane T6 which is topography different from the topography having slope T1 shown in FIG. 7.

An angle of depression of the optical axis of first stereo camera 50 (matching with optical axis AX1 of first image pick-up portion 51 and optical axis AX2 of second image pick-up portion 52 in the side view shown in FIG. 8) is greater than an angle of depression of the optical axis of second stereo camera 60 (matching with optical axis AX3 of third image pick-up portion 61 and optical axis AX4 of fourth image pick-up portion 62 in the side view shown in FIG. 8). Therefore, first stereo camera 50 picks up an image of image pick-up range R1 relatively close to the vehicular main body. Second stereo camera 60 picks up an image of image pick-up range R2 relatively distant from the vehicular main body. Second stereo camera 60 picks up an image of image pick-up range R2 beyond image pick-up range R1 of which image is picked up by first stereo camera 50. Image pick-up range R1 overlaps with image pick-up range R2.

Figure 9:
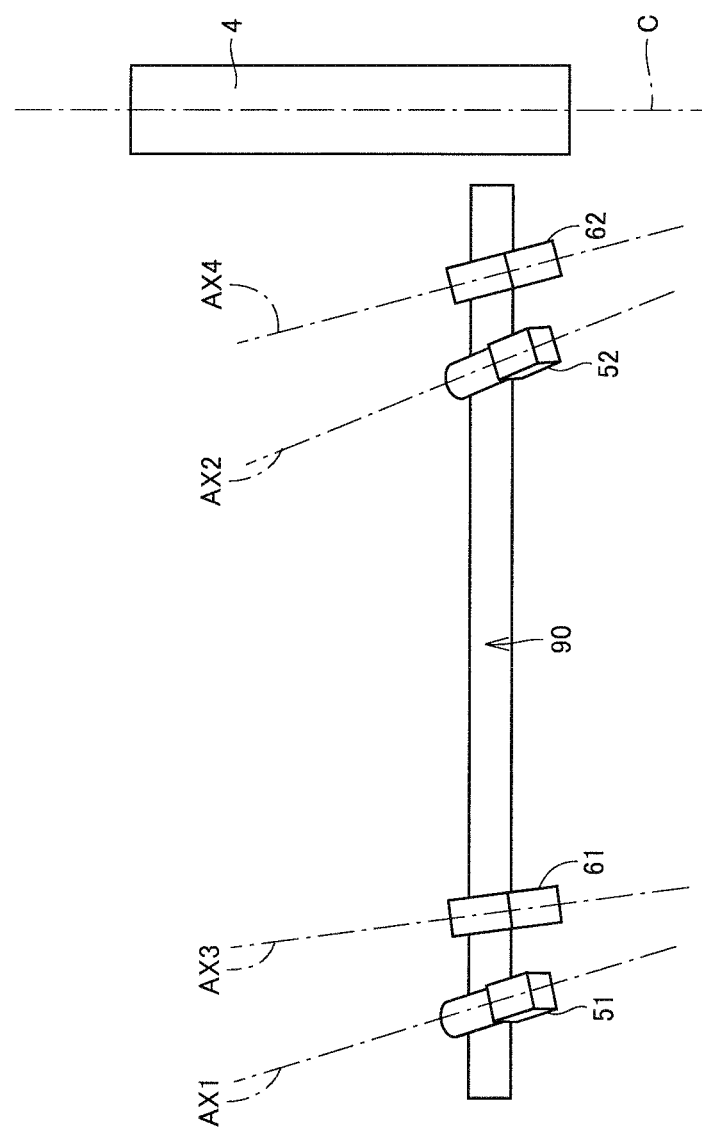
FIG. 9 is a schematic diagram of the image pick-up portion of the stereo camera when viewed planarly.

FIG. 9 is a schematic diagram of the first to fourth image pick-up portions of first stereo camera 50 and second stereo camera 60 when viewed planarly. FIG. 9 schematically shows a state that base portion 90 attached in cab 5, first image pick-up portion 51, second image pick-up portion 52, third image pick-up portion 61, and fourth image pick-up portion 62 supported on base portion 90, and work implement 4 are planarly viewed. The right side in FIG. 9 corresponds to the right direction of the vehicular main body, the left side in FIG. 9 corresponds to the left direction of the vehicular main body, the upper side in FIG. 9 corresponds to the fore direction of the vehicular main body, and the lower side in FIG. 9 corresponds to the aft direction of the vehicular main body.

FIG. 9 shows respective optical axes AX1, AX2, AX3, and AX4 of first image pick-up portion 51, second image pick-up portion 52, third image pick-up portion 61, and fourth image pick-up portion 62 described above. FIG. 9 shows a central axis C of work implement 4 with a chain dotted line. As shown in FIG. 9, a line which extends in a direction of extension of work implement 4 in the plan view and passes through the center of work implement 4 in a direction of a short side orthogonal to the direction of extension is defined as central axis C of work implement 4. Since work implement 4 in the present embodiment is pivotally supported on the front side of revolving unit 3 as described above, central axis C of work implement 4 extends in the fore/aft direction of the vehicular main body.

Optical axis AX1 of first image pick-up portion 51 and optical axis AX2 of second image pick-up portion 52 are inclined with respect to the direction of extension of central axis C of work implement 4 in the plan view as shown in FIG. 9. Optical axes AX1 and AX2 extend in a direction away from work implement 4 as a distance from the main body of hydraulic excavator 1 is greater toward the front in the plan view. Optical axes AX1 and AX2 in the plan view intersect with central axis C of work implement 4 in the rear of first image pick-up portion 51 and second image pick-up portion 52.

The optical axis of first stereo camera 50 in the plan view is defined as a direction of extension of a straight line which passes through a point of intersection of optical axis AX1 of first image pick-up portion 51 and optical axis AX2 of second image pick-up portion 52, divides an angle formed between optical axis AX1 and optical axis AX2 into two equal sections, and passes through a point intermediate between first image pick-up portion 51 and second image pick-up portion 52. Both optical axis AX1 of first image pick-up portion 51 and optical axis AX2 of second image pick-up portion 52 extend in the direction away from the work implement as the distance from the main body of hydraulic excavator 1 is greater toward the front in the plan view. Therefore, the optical axis of first stereo camera 50 in the plan view is also inclined with respect to the direction of extension of central axis C of work implement 4 so as to extend in the direction away from the work implement as the distance from the main body of hydraulic excavator 1 is greater toward the front.

First image pick-up portion 51 is arranged at a position more distant from work implement 4 than second image pick-up portion 52 in the lateral direction of the main body of hydraulic excavator 1. Optical axis AX1 of first image pick-up portion 51 and optical axis AX2 of second image pick-up portion 52 are inclined at angles different from each other with respect to the direction of extension of central axis C of work implement 4 in the plan view. An angle of inclination of optical axis AX1 of first image pick-up portion 51 with respect to the direction of extension of central axis C of work implement 4 is smaller than an angle of inclination of optical axis AX2 of second image pick-up portion 52 with respect to the direction of extension of central axis C of work implement 4.

First image pick-up portion 51 and second image pick-up portion 52 are arranged such that optical axes AX1 and AX2 intersect with each other in front of the main body of hydraulic excavator 1, instead of optical axes AX1 and AX2 being in parallel to each other. Therefore, the range of image pick-up by first image pick-up portion 51 reliably overlaps with the range of image pick-up by second image pick-up portion 52. Thus, even when first image pick-up portion 51 and second image pick-up portion 52 are arranged at a distance from each other in the lateral direction of revolving unit 3, a pair of images of an object picked up by first stereo camera 50 can reliably be obtained and a three-dimensional image of an object of which image is picked up can be constructed by subjecting the pair of images to stereo processing.

As shown in FIG. 9, optical axis AX3 of third image pick-up portion 61 and optical axis AX4 of fourth image pick-up portion 62 are inclined with respect to the direction of extension of central axis C of work implement 4 in the plan view. Optical axes AX3 and AX4 extend in the direction away from work implement 4 as a distance from the main body of hydraulic excavator 1 is greater toward the front in the plan view. Optical axes AX3 and AX4 in the plan view intersect with central axis C of work implement 4 in the rear of third image pick-up portion 61 and fourth image pick-up portion 62.

The optical axis of second stereo camera 60 in the plan view is defined as a direction of extension of a straight line which passes through a point of intersection of optical axis AX3 of third image pick-up portion 61 and optical axis AX4 of fourth image pick-up portion 62, divides an angle formed between optical axis AX3 and optical axis AX4 into two equal sections, and passes through a point intermediate between third image pick-up portion 61 and fourth image pick-up portion 62. Both optical axis AX3 of third image pick-up portion 61 and optical axis AX4 of fourth image pick-up portion 62 extend in the direction away from the work implement as the distance from the main body of hydraulic excavator 1 is greater toward the front in the plan view. Therefore, the optical axis of second stereo camera 60 in the plan view is also inclined with respect to the direction of extension of central axis C of work implement 4 so as to extend in the direction away from the work implement as the distance from the main body of hydraulic excavator 1 is greater toward the front.

Third image pick-up portion 61 is arranged at a position more distant from work implement 4 than fourth image pick-up portion 62 in the lateral direction of the main body of hydraulic excavator 1. Optical axis AX3 of third image pick-up portion 61 and optical axis AX4 of fourth image pick-up portion 62 are inclined at angles different from each other with respect to the direction of extension of central axis C of work implement 4 in the plan view. An angle of inclination of optical axis AX3 of third image pick-up portion 61 with respect to the direction of extension of central axis C of work implement 4 is smaller than an angle of inclination of optical axis AX4 of fourth image pick-up portion 62 with respect to the direction of extension of central axis C of work implement 4.

Third image pick-up portion 61 and fourth image pick-up portion 62 are arranged such that optical axes AX3 and AX4 intersect with each other in front of the main body of hydraulic excavator 1, instead of optical axes AX3 and AX4 being in parallel to each other. Therefore, the range of image pick-up by third image pick-up portion 61 reliably overlaps with the range of image pick-up by fourth image pick-up portion 62. Thus, even when third image pick-up portion 61 and fourth image pick-up portion 62 are arranged at a distance from each other in the lateral direction of revolving unit 3, a pair of images of an object picked up by second stereo camera 60 can reliably be obtained and a three-dimensional image of an object of which image is picked up can be constructed by subjecting the pair of images to stereo processing.

Figure 10:
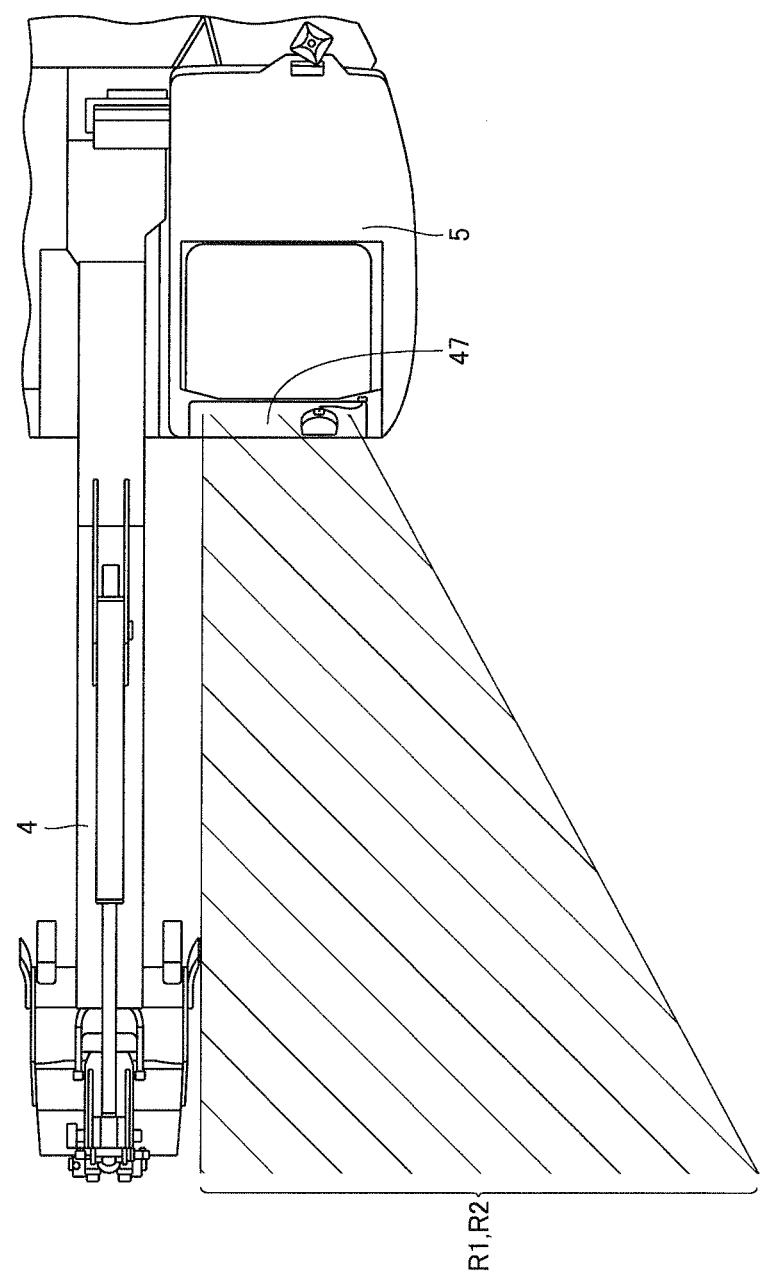
FIG. 10 is a schematic diagram showing the range of image pick-up by the stereo camera when viewed planarly.

FIG. 10 is a schematic diagram showing the ranges of image pick-up by first stereo camera 50 and second stereo camera 60 when viewed planarly. A hatched range in FIG. 10 indicates a range within an angle of view of first stereo camera 50 and second stereo camera 60 in the plan view.

As described above, both the optical axis of first stereo camera 50 and the optical axis of second stereo camera 60 in the plan view are inclined with respect to the direction of extension of central axis C of work implement 4 so as to extend in the direction away from the work implement as the distance from the main body of hydraulic excavator 1 is greater toward the front. Work implement 4 is not present in the ranges of image pick-up by first stereo camera 50 and second stereo camera 60. As a result, a phenomenon in which work implement 4 partially hides an object of which image is picked up is avoided regardless of the position of work implement 4.

Figure 11:
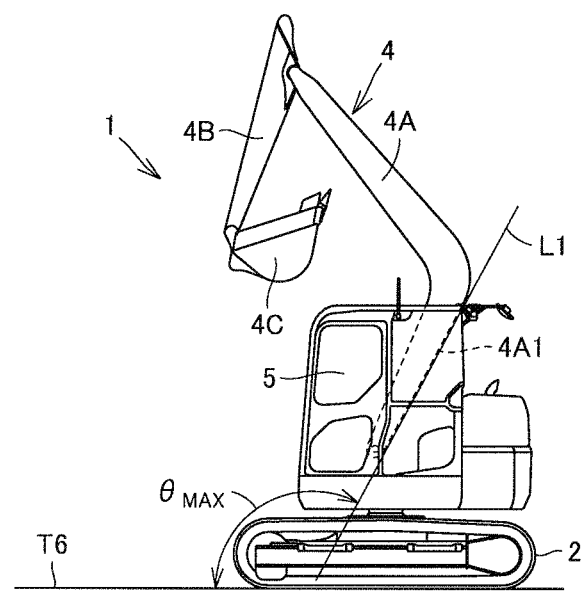
FIG. 11 is a side view of the hydraulic excavator in a state where a work implement has been raised to the highest position.

Next, description will be given of the new findings obtained by the present inventor about a phenomenon in which the accuracy of image pick-up is reduced when image pick-up by the stereo camera is performed with work implement 4 swung up. FIG. 11 is a side view of hydraulic excavator 1 in a state where work implement 4 has been raised to the highest position.

Hydraulic excavator 1 shown in FIG. 11 is located on plane T6. Boom 4A of work implement 4 has a boom rear surface 4A1. A straight line L1 shown in FIG. 11 indicates a direction of extension of boom rear surface 4A1 viewed from the side. An angle θMAX shown in FIG. 11 refers to an angle formed by boom rear surface 4A1 of boom 4A of work implement 4 swung up to the highest position with respect to plane T6 which is the ground where hydraulic excavator 1 is currently located. Angle θMAX refers to an angle formed by straight line L1 with respect to plane T6.

Figure 12:
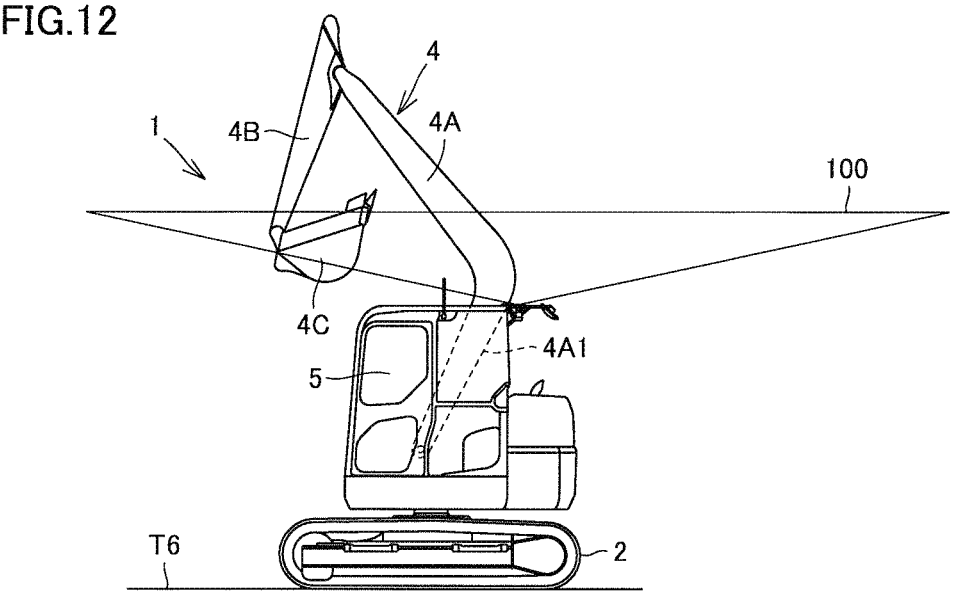
FIG. 12 is a side view showing an influence that the work implement has on the reception environment of a main antenna.
Figure 13:
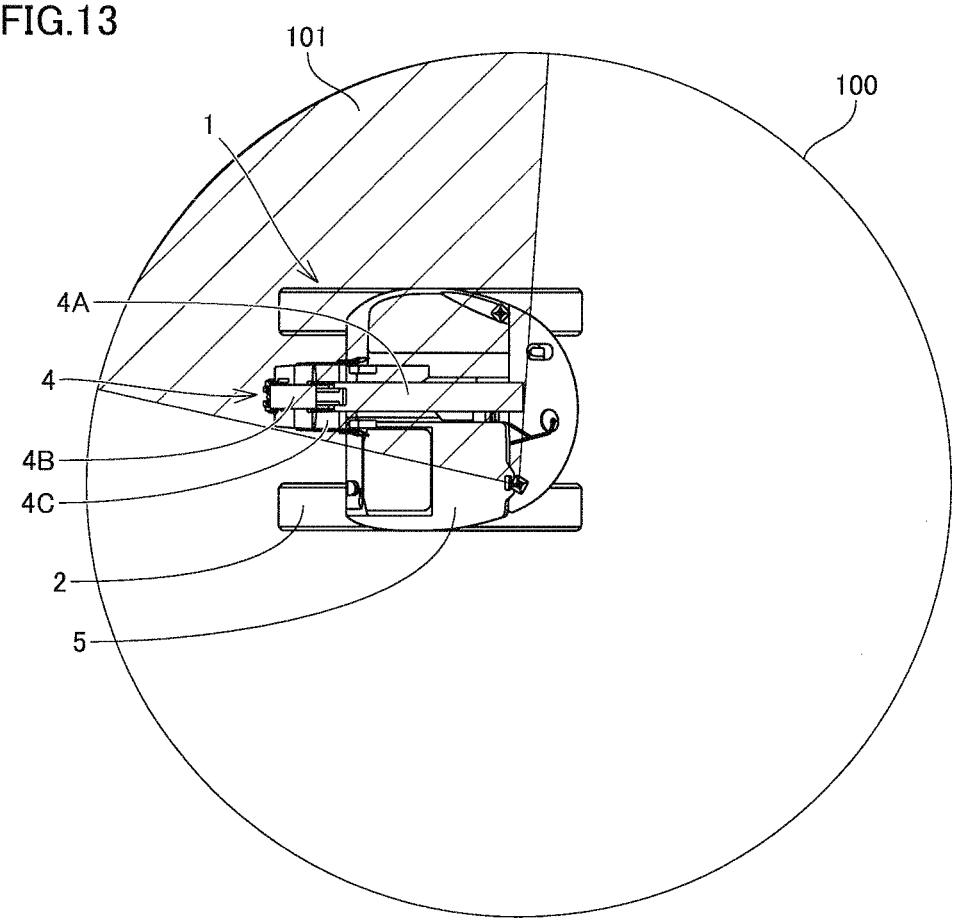
FIG. 13 is a plan view showing the influence that the work implement has on the reception environment of the main antenna.

FIG. 12 is a side view showing an influence that work implement 4 has on the reception environment of main antenna 9A. FIG. 13 is a plan view showing the influence that work implement 4 has on the reception environment of main antenna 9A. In FIGS. 12 and 13, a reception range 100 of main antenna 9A is shown to overlap with hydraulic excavator 1. An obstructed range 101 hatched in FIG. 13 indicates a range obstructed by work implement 4, of the range of 360° of main antenna 9A.

Similarly to FIG. 11, work implement 4 shown in FIGS. 12 and 13 has been swung up to the highest position. Work implement 4 raised to the highest position is within reception range 100 of main antenna 9A. Work implement 4 is formed of metal represented by a steel material. Therefore, work implement 4 located within reception range 100 of main antenna 9A blocks a radio signal to be received by main antenna 9A and disallows main antenna 9A to receive a radio wave, or reflects a radio wave to cause a disturbance in a radio signal received by main antenna 9A.

Figure 14:
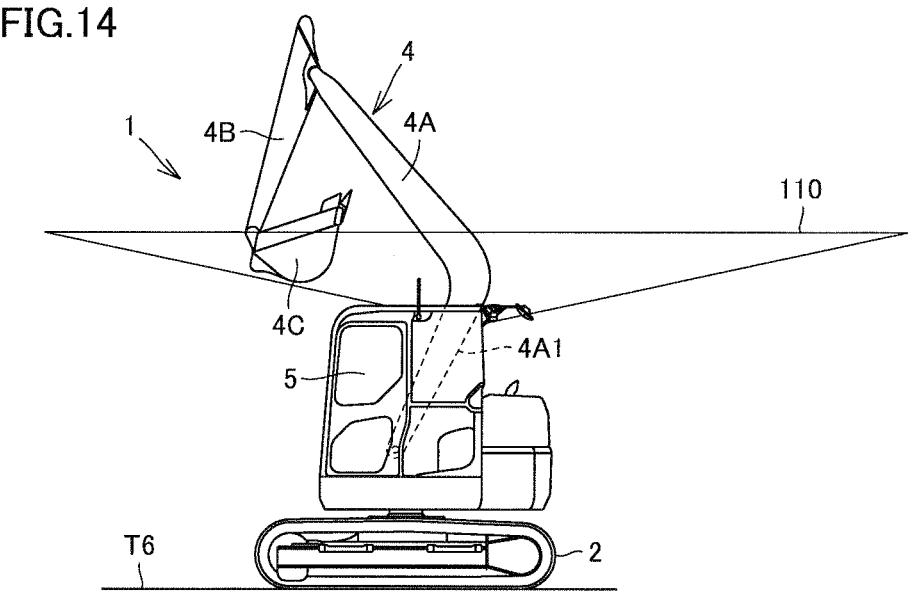
FIG. 14 is a side view showing an influence that the work implement has on the reception environment of a sub-antenna.
Figure 15:
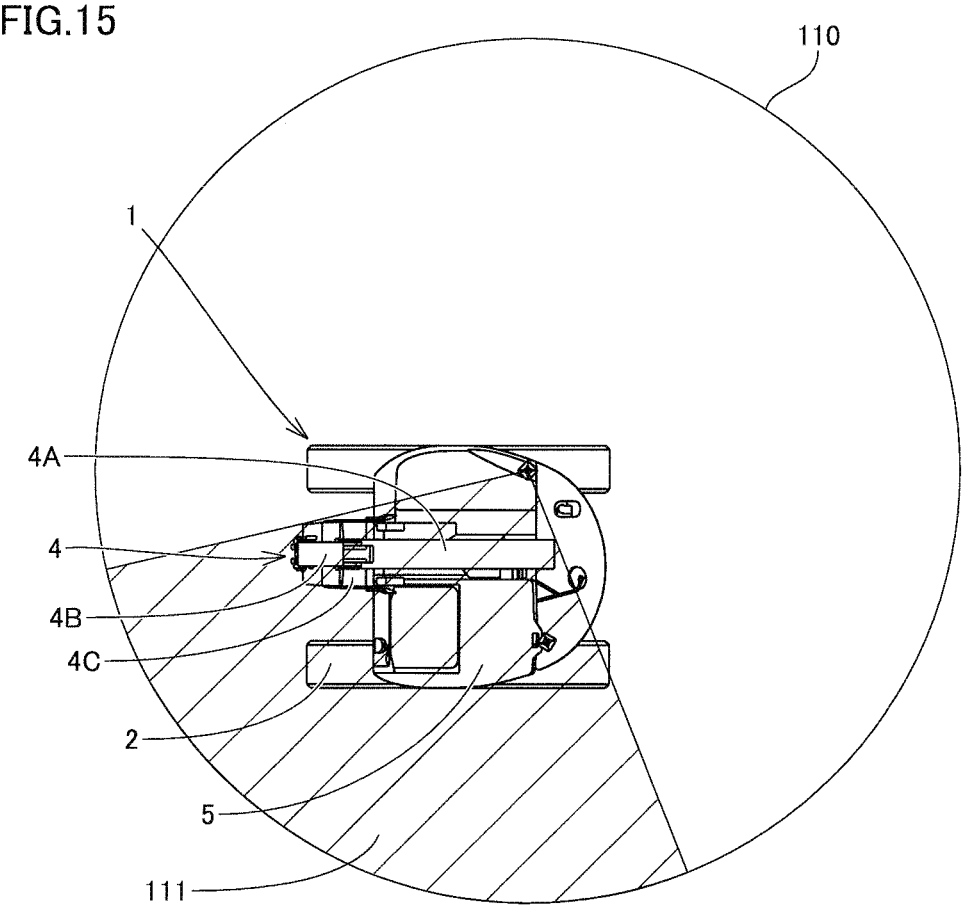
FIG. 15 is a plan view showing the influence that the work implement has on the reception environment of the sub-antenna.

FIG. 14 is a side view showing an influence that work implement 4 has on the reception environment of sub-antenna 9B. FIG. 15 is a plan view showing the influence that work implement 4 has on the reception environment of sub-antenna 9B. In FIGS. 14 and 15, a reception range 110 of sub-antenna 9B is shown to overlap with hydraulic excavator 1. An obstructed range 111 hatched in FIG. 15 indicates a range obstructed by work implement 4, of the range of 360° of sub-antenna 9B.

Similarly to FIG. 11, work implement 4 shown in FIGS. 14 and 15 has been swung up to the highest position. Work implement 4 raised to the highest position is within reception range 110 of sub-antenna 9B. Work implement 4 is formed of metal represented by a steel material. Therefore, work implement 4 located within reception range 110 of sub-antenna 9B blocks a radio signal to be received by sub-antenna 9B and disallows sub-antenna 9B to receive a radio wave, or reflects a radio wave to cause a disturbance in a radio signal received by sub-antenna 9B.

Work implement 4 raised to the highest position serves as a blockage of the radio signal to main antenna 9A and sub-antenna 9B, and affects the accuracy of measurement of the current position of hydraulic excavator 1 using main antenna 9A and sub-antenna 9B. A reduction in accuracy of measurement of the current position of hydraulic excavator 1 causes a deviation between the ranges of image pick-up by the pair of image pick-up portions of the stereo camera. As a result, the accuracy of pick-up of an image of an existing topography by the stereo camera is reduced.

Particularly, hydraulic excavator 1 in the embodiment is of small swing radius type, and thus, angle θMAX shown in FIG. 11 when work implement 4 is swung up to the highest position is set to be great in order to reduce the swing radius. For example, as shown in FIG. 11, angle θMAX exceeds 90°. Angle θMAX is set at an obtuse angle. Therefore, work implement 4 raised to the highest position is arranged in the more rear portion of revolving unit 3 and arranged closer to antenna 9. Since work implement 4 raised to the highest position has a greater influence on the reception environment of antenna 9, the accuracy of pick-up of an image of an existing topography is likely to decrease.

Therefore, in hydraulic excavator 1 in the present embodiment, as shown in FIG. 9, optical axis AX1 of first image pick-up portion 51 and optical axis AX2 of second image pick-up portion 52 of first stereo camera 50 are inclined away from work implement 4 at angles different from each other with respect to central axis C of work implement 4 in the plan view as the distance from the main body of hydraulic excavator 1 is greater. Optical axis AX3 of third image pick-up portion 61 and optical axis AX4 of fourth image pick-up portion 62 of second stereo camera 60 are inclined away from work implement 4 at angles different from each other with respect to central axis C of work implement 4 in the plan view as the distance from the main body of hydraulic excavator 1 is greater.

The image pick-up apparatus is arranged as described above, and thus, work implement 4 is not included within the angle of view of the stereo camera viewed planarly as shown in FIG. 10. Since work implement 4 is out of the angle of view of the stereo camera regardless of an attitude of work implement 4 and work implement 4 does not obstruct the angle of view of the stereo camera, it is unnecessary to raise work implement 4 when performing image pick-up by the stereo camera. With work implement 4 lowered, an image of an existing topography can be picked up using the stereo camera, and in this case, reception ranges 100 and 110 of antenna 9 are not obstructed by work implement 4. Therefore, an image of an existing topography can accurately be picked up.

Since the operation for raising work implement 4 before performing image pick-up is not required, the work efficiency can be improved. Image pick-up can be performed without raising work implement 4, and thus, even when there is an obstacle such as an electric wire above hydraulic excavator 1, image pick-up is not obstructed by the obstacle. Even when hydraulic excavator 1 is located on an inclined ground or a soft ground, it is possible to prevent the attitude of hydraulic excavator 1 from becoming unstable during image pick-up, because image pick-up can be performed without raising work implement 4.

As shown in FIG. 12, first image pick-up portion 51 is arranged at a position more distant from work implement 4 than second image pick-up portion 52 in the lateral direction of the vehicular main body. The angle of inclination of optical axis AX1 of first image pick-up portion 51 with respect to central axis C of work implement 4 is smaller than the angle of inclination of optical axis AX2 of second image pick-up portion 52 with respect to central axis C of work implement 4. As a result, optical axis AX1 of first image pick-up portion 51 and optical axis AX2 of second image pick-up portion 52 reliably intersect with each other in front of the main body of hydraulic excavator 1, and thus, first image pick-up portion 51 and second image pick-up portion 52 can simultaneously pick up images of the image pick-up range in front of the main body of hydraulic excavator 1. Therefore, an image of an object of which image is picked up, such as an existing topography in front of hydraulic excavator 1, can accurately be picked up.

Second Embodiment

Figure 16:
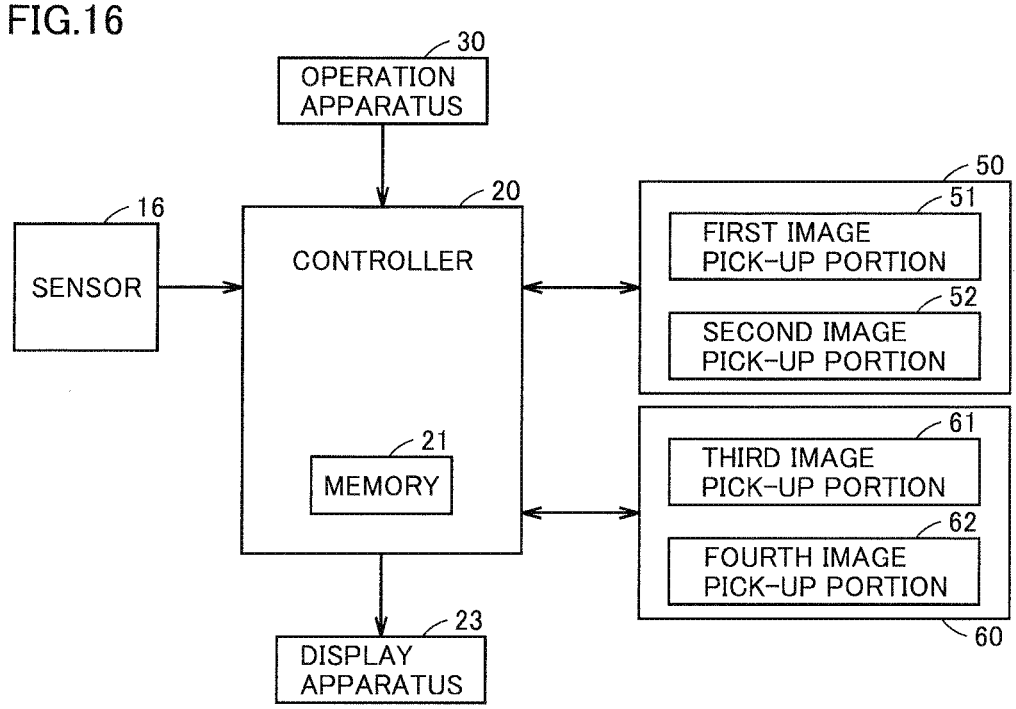
FIG. 16 is a diagram illustrating functional blocks of the hydraulic excavator based on an embodiment.

Although hydraulic excavator 1 in a second embodiment includes almost the same hardware configuration as that of hydraulic excavator 1 in the first embodiment, hydraulic excavator 1 in the second embodiment is different from hydraulic excavator 1 in the first embodiment in terms of a functional configuration implemented by a controller 20. FIG. 16 is a diagram illustrating functional blocks of hydraulic excavator 1 based on the embodiment.

As shown in FIG. 16, hydraulic excavator 1 includes controller 20 for controlling the operation of hydraulic excavator 1. Controller 20 includes a memory 21. Memory 21 is provided as a region where programs for performing various types of operations in hydraulic excavator 1 are stored and necessary data is stored. Controller 20 performs various types of processing based on the programs stored in memory 21.

First stereo camera 50 is electrically connected to controller 20. Controller 20 outputs, to first stereo camera 50, a command signal for commanding first stereo camera 50 to pick up an image of the front region of hydraulic excavator 1 (image pick-up range R1 shown in FIGS. 7 and 8). Two-dimensional images picked up by first image pick-up portion 51 and second image pick-up portion 52 of first stereo camera 50 are input to controller 20.

Controller 20 subjects the two two-dimensional images simultaneously picked up by first image pick-up portion 51 and second image pick-up portion 52 from different angles to stereo matching and calculates image data on a three-dimensional shape of the front region of which image is picked up. More specifically, controller 20 finds a three-dimensional shape of the front region by calculating a distance from first image pick-up portion 51 to the front region of which image is picked up and a distance from second image pick-up portion 52 to the front region by using principles of triangulation based on a parallax between first image pick-up portion 51 and second image pick-up portion 52.

Second stereo camera 60 is electrically connected to controller 20. Controller 20 outputs, to second stereo camera 60, a command signal for commanding second stereo camera 60 to pick up an image of the front region of hydraulic excavator 1 (image pick-up range R2 shown in FIGS. 7 and 8). Two-dimensional images picked up by third image pick-up portion 61 and fourth image pick-up portion 62 of second stereo camera 60 are input to controller 20.

Controller 20 subjects the two two-dimensional images simultaneously picked up by third image pick-up portion 61 and fourth image pick-up portion 62 from different angles to stereo matching and calculates image data on a three-dimensional shape of the front region of which image is picked up. More specifically, controller 20 finds a three-dimensional shape of the front region by calculating a distance from third image pick-up portion 61 to the front region of which image is picked up and a distance from fourth image pick-up portion 62 to the front region by using principles of triangulation based on a parallax between third image pick-up portion 61 and fourth image pick-up portion 62.

Controller 20 further synthesizes image data calculated from image pick-up by first stereo camera 50 and image data calculated from image pick-up by second stereo camera 60 into one. Image data is synthesized by projecting one image data on a coordinate system of the other image data based on relative positions of first stereo camera 50 and second stereo camera 60. Two pieces of image data are synthesized as being aligned vertically such that common three-dimensional shapes overlap each other. Thus, such image data that ranges from toe of slope T3 to top of slope T2 of slope T1 shown in FIG. 7 are synthesized over a wide range can be obtained.

The above-described image processing may be performed by controller 20 itself. Alternatively, the two-dimensional image picked up by each image pick-up portion may be transmitted from controller 20 to an external supervisory station, the supervisory station may perform image processing, and the obtained three-dimensional image data may be transmitted from the supervisory station to controller 20.

Hydraulic excavator 1 also includes an operation apparatus 30. Operation apparatus 30 is arranged in cab 5. An operator who gets on cab 5 inputs, to operation apparatus 30, an instruction for instructing first stereo camera 50 and second stereo camera 60 to perform image pick-up. When receiving the input indicating that the operator has operated operation apparatus 30, controller 20 outputs, to first stereo camera 50 and/or second stereo camera 60, the command signal(s) for commanding first stereo camera 50 and/or second stereo camera 60 to perform image pick-up.

Hydraulic excavator 1 also includes a sensor 16. Sensor 16 detects an angle formed by boom rear surface 4A1 of boom 4A of work implement 4 with respect to the ground where hydraulic excavator 1 is currently located. Sensor 16 may be a rotary encoder provided in the boom pin at the base end portion of boom 4A for detecting a rotation angle of boom 4A with respect to revolving unit 3. Sensor 16 may be a cylinder stroke sensor attached to hydraulic cylinder 4F that drives boom 4A. Sensor 16 may be a pressure sensor provided in a hydraulic piping connected to each of a bottom-side oil chamber and a head-side oil chamber of hydraulic cylinder 4F for detecting a hydraulic pressure in the hydraulic piping.

Hydraulic excavator 1 also includes a display apparatus 23. Display apparatus 23 displays whether or not image pick-up by first stereo camera 50 and/or second stereo camera 60 is currently possible. Display apparatus 23 displays whether or not operation apparatus 30 for the operator to input the image pick-up instruction can be currently operated.

Figure 17:
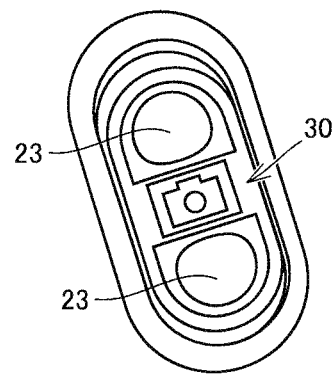
FIG. 17 is a perspective view schematically showing a construction of an operation apparatus.

FIG. 17 is a perspective view schematically showing a construction of operation apparatus 30. Display apparatus 23 in the embodiment shown in FIG. 17 is integrated with operation apparatus 30. Display apparatus 23 has a light emitter that can light up. Operation apparatus 30 integrated with display apparatus 23 can be implemented, for example, as an LED (light-emitting diode) illumination-type rocker switch. Display apparatus 23 switches the manner of lighting up between when image pick-up is possible and when image pick-up is impossible. For example, display apparatus 23 may continue lighting when image pick-up is possible, and display apparatus 23 may blink or be switched off when image pick-up is impossible. Alternatively, display apparatus 23 may switch light-up colors of display apparatus 23 between when image pick-up is possible and when image pick-up is impossible.

Display apparatus 23 is not limited to the configuration in which display apparatus 23 is integrated with operation apparatus 30, and display apparatus 23 may be provided separately from operation apparatus 30. Display apparatus 23 that can light up may be provided separately from operation apparatus 30, or display apparatus 23 may be implemented as one function of a display arranged in cab 5.

Figure 18:
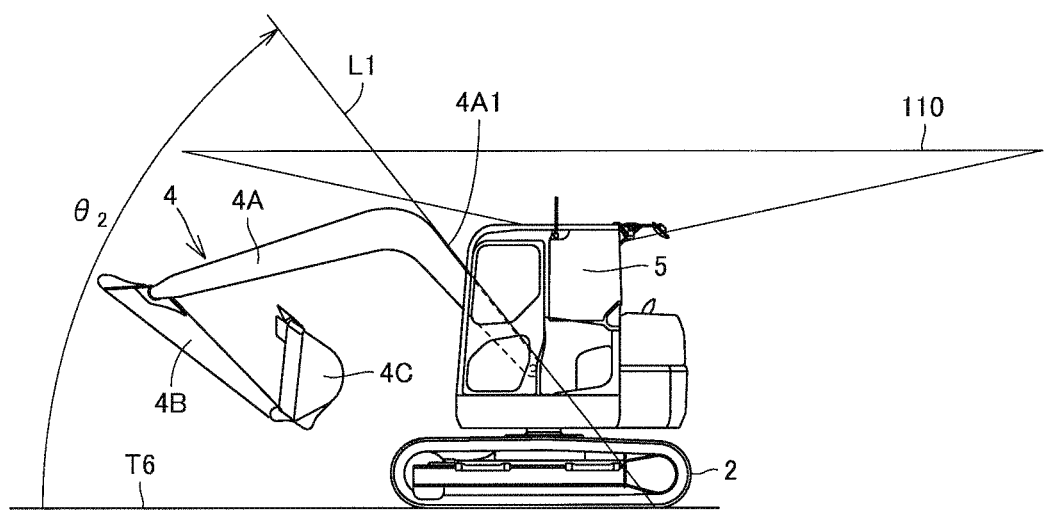
FIG. 18 is a side view showing arrangement of the work implement that does not affect the reception environment of the antenna.

FIG. 18 is a side view showing arrangement of work implement 4 that does not affect the reception environment of antenna 9. FIG. 18 shows reception range 110 of sub-antenna 9B similar to that in FIG. 14. Work implement 4 shown in FIG. 18 is out of reception range 110 of sub-antenna 9B. Boom 4A of work implement 4 shown in FIG. 18 has been swung up to the highest position to such an extent that boom 4A does not interfere with reception range 110 of sub-antenna 9B. An angle θ2 shown in FIG. 18 refers to an angle formed by boom rear surface 4A1 of boom 4A swung up to the highest position to such an extent that boom 4A does not interfere with reception range 110 of sub-antenna 9B, with respect to plane T6 which is the ground where hydraulic excavator 1 is currently located. Boom rear surface 4A1 shown in FIG. 18 is located near a boundary of the reception range of sub-antenna 9B.

FIG. 19 is a diagram showing a relation between the angle of work implement 4 with respect to the ground and whether or not image capture can be accepted. An angle θMIN shown in FIG. 19 refers to an angle formed by boom rear surface 4A1 of boom 4A lowered to the lowest position with respect to plane T6 which is the ground where hydraulic excavator 1 is currently located.

An angle θ1 shown in FIG. 19 refers to an angle formed by boom rear surface 4A1 with respect to plane T6 which is the ground where hydraulic excavator 1 is currently located, and to an angle greater than angle θ2 and smaller than angle θMAX. When the angle formed by boom rear surface 4A1 with respect to the ground where hydraulic excavator 1 is currently located is angle θ1, work implement 4 is located at a position where work implement 4 partially obstructs reception range 110 of sub-antenna 9B. However, obstructed range 111 (see FIG. 15) where work implement 4 obstructs reception range 110 is smaller than the obstructed range when work implement 4 is swung up to the highest position. Angle θ1 is, for example, 90°.

As shown in FIG. 19, when the angle formed by boom rear surface 4A1 with respect to the ground is not smaller than angle θMIN and not greater than angle θ2, work implement 4 does not interfere with reception range 110 of sub-antenna 9B, and thus, acceptance of image capture is allowed. Even when boom 4A of work implement 4 is raised and the angle formed by boom rear surface 4A1 with respect to the ground exceeds angle θ2, acceptance of image capture remains possible if the angle is smaller than angle θ1.

When the angle formed by boom rear surface 4A1 with respect to the ground reaches angle θ1, acceptance of image capture is disallowed. When the angle formed by boom rear surface 4A1 with respect to the ground is in the range of not smaller than angle θ1 and not greater than angle θMAX, work implement 4 interferes with reception range 110 of sub-antenna 9B and an image of an existing topography cannot accurately be picked up by the stereo camera, and thus, acceptance of image capture is disallowed. When the angle formed by boom rear surface 4A1 with respect to the ground is not smaller than angle θ1, image pick-up by the stereo camera is disallowed.

When boom 4A of work implement 4 is lowered from the state in which the angle formed by boom rear surface 4A1 with respect to the ground is not smaller than angle θ1, acceptance of image capture remains impossible even if the angle falls below angle θ1. When the angle formed by boom rear surface 4A1 with respect to the ground reaches angle θ2, acceptance of image capture is allowed.

Angle θ1 at which switching from the state in which image capture can be accepted to the state in which image capture cannot be accepted is performed during raising of work implement 4 is set to be different from angle θ2 at which switching from the state in which image capture cannot be accepted to the state in which image capture can be accepted is performed during lowering of work implement 4. Angle θ2 at which switching from the state in which image capture cannot be accepted to the state in which image capture can be accepted is performed during lowering of work implement 4 is set to be smaller than angle θ1 at which switching from the state in which image capture can be accepted to the state in which image capture cannot be accepted is performed during raising of work implement 4.

In hydraulic excavator 1 in the second embodiment described above, as shown in FIG. 19, controller 20 disallows image pick-up by first stereo camera 50 and second stereo camera 60, when the angle formed by boom 4A with respect to the ground where hydraulic excavator 1 is located is not smaller than angle θ1.

As described in the first embodiment with reference to FIGS. 12 to 15, when the angle formed by boom 4A with respect to the ground where hydraulic excavator 1 is located is great, work implement 4 interferes with the reception range of the antenna, and thus, the accuracy of measurement of the current position of hydraulic excavator 1 is reduced and the accuracy of pick-up of an image of an existing topography by the stereo camera is reduced. Thus, when work implement 4 is arranged at a position where the accuracy of image pick-up by the stereo camera may be reduced, image pick-up by the stereo camera is disallowed. As a result, when image pick-up by the stereo camera is allowed, work implement 4 has a small influence on the accuracy of image pick-up by the stereo camera. Unintended acquisition of image data with low image pick-up accuracy can be avoided, and thus, image pick-up data of an object of which image is picked up, such as an existing topography in front of hydraulic excavator 1, can accurately be obtained.

In addition, as shown in FIG. 19, controller 20 disallows operation apparatus 30 to accept the operation for performing image pick-up, when the angle formed by boom 4A with respect to the ground where hydraulic excavator 1 is located is not smaller than angle θ1. When work implement 4 is arranged at a position where the accuracy of image pick-up by the stereo camera may be reduced, the operation itself for performing image pick-up is disallowed, and thus, unintended acquisition of image data with low image pick-up accuracy can be reliably avoided.

In addition, as shown in FIG. 19, controller 20 allows operation apparatus 30 to accept the operation for performing image pick-up, when the angle formed by boom 4A with respect to the ground where hydraulic excavator 1 is located becomes angle θ2 smaller than angle θ1 in a state where operation apparatus 30 cannot accept the operation for performing image pick-up. Image pick-up by the stereo camera is allowed after work implement 4 moves to a position where work implement 4 does not affect the reception environment of antenna 9. Therefore, image pick-up data that is not affected by work implement 4 can accurately be obtained.

In addition, as shown in FIGS. 16 and 17, hydraulic excavator 1 further includes display apparatus 23 for displaying whether or not image pick-up by the stereo camera is possible. With such a configuration, by visually recognizing display apparatus 23, an operator can easily recognize whether or not image pick-up is possible.

In addition, as shown in FIG. 1, hydraulic excavator 1 is of small swing radius type. In hydraulic excavator 1 of small swing radius type, angle θMAX when work implement 4 is swung up to the highest position is set to be great in order to reduce the swing radius. Work implement 4 raised to the highest position is arranged in the more rear portion of revolving unit 3 and arranged closer to antenna 9. Work implement 4 raised to the highest position has a greater influence on the reception environment of antenna 9. Therefore, when work implement 4 is arranged at a position where the accuracy of image pick-up may be reduced, image pick-up by the stereo camera is disallowed, and thereby, the effect of being able to accurately obtain image pick-up data of an object of which image is picked up can be more significantly obtained.

In the embodiments described so far, hydraulic excavator 1 has cab 5 and each image pick-up portion constituting a stereo camera is attached to cab 5. Hydraulic excavator 1 does not necessarily have to have cab 5. Hydraulic excavator 1 is not limited to such specifications that an operator gets on hydraulic excavator 1 and operates hydraulic excavator 1, but it may be operated as being remotely controlled from outside. In this case, since hydraulic excavator 1 does not require cab 5 for an operator to get on, it does not have to have cab 5.

In the embodiment, description has been given of the example in which hydraulic excavator 1 includes controller 20 and controller 20 performs control as to whether or not to accept image pick-up as shown in FIG. 17. The idea of the embodiment is applicable to a system in which the controller is provided separately from hydraulic excavator 1. In the case of hydraulic excavator 1 designed to be operated as being remotely controlled, the controller for controlling the operation of hydraulic excavator 1 is arranged outside hydraulic excavator 1. In this case as well, by applying the idea of the embodiment, the effect of being able to accurately obtain image pick-up data of an object of which image is picked up can be similarly obtained.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 hydraulic excavator; 2 travel unit; 3 revolving unit; 4 work implement; 4A boom; 4A1 boom rear surface; 4B arm; 4C bucket; 4D, 4E, 4F hydraulic cylinder; 5 cab; 6A engine hood; 6B soil cover, 6C sheet metal cover, 7 counterweight; 9 antenna; 9A main antenna; 9B sub-antenna; 10 bracket; 11A mirror; 11B stay; 16 sensor; 20 controller; 21 memory; 23 display apparatus; 30 operation apparatus; 40 front pillar; 41 right pillar; 42 left pillar; 47 front window; 48a right roof beam; 48b left roof beam; 49 roof panel; 50 first stereo camera; 51 first image pick-up portion; 52 second image pick-up portion; 60 second stereo camera; 61 third image pick-up portion; 62 fourth image pick-up portion; 81 left case; 82 right case; 90 base portion; 100, 110 reception range; 101, 111 obstructed range; AX1, AX2, AX3, AX4 optical axis; C central axis; L1 straight line; R1, R2 image pick-up range; T1 slope; T2 top of slope; T3 toe of slope; T4 upper ground; T5 lower ground; and T6 plane.

The invention claimed is:

1. An earth-moving machine comprising:
a main body;
a work implement attached to the main body, the work implement having a central axis in a plan view; and
an image pick-up apparatus including a first image pick-up portion and a second image pick-up portion, the first image pick-up portion and the second image pick-up portion implement a stereo camera, the first image pick-up portion is arranged at a position more distant from the work implement than the second image pick-up portion in a lateral direction of the main body, the first image pick-up portion and the second image pick-up portion are arranged on a same side of the work implement in the lateral direction, the first image pick-up portion and the second image pick-up portion capture an image in front of the earth-moving machine, an optical axis of the first image pick-up portion and an optical axis of the second image pick-up portion are inclined in a plan view away from the work implement with respect to the central axis in the lateral direction as a distance from the main body is greater toward a front of the earth-moving machine, the first image pick-up portion and the second image pick-up portion are arranged such that the optical axis of the first image pick-up portion and the optical axis of the second image pick-up portion intersect with each other in front of the main body, a range of image pick-up by the first image pick-up portion overlaps with a range of image pick-up by the second image pick-up portion, and the work implement is out of an angle of view of the image pick-up apparatus regardless of an attitude of the work implement.

2. The earth moving machine according to claim 1, wherein
an angle of inclination of the optical axis of the first image pick-up portion with respect to the central axis is smaller than an angle of inclination of the optical axis of the second image pick-up portion with respect to the central axis.

3. A system for an earth-moving machine, the system comprising:
a main body;
a work implement attached to the main body, the work implement having a central axis in a plan view; and
an image pick-up apparatus including a first image pick-up portion and a second image pick-up portion, the first image pick-up portion and the second image pick-up portion implement a stereo camera, the first image pick-up portion is arranged at a position more distant from the work implement than the second image pick-up portion in a lateral direction of the main body, the first image pick-up portion and the second image pick-up portion are arranged on a same side of the work implement in the lateral direction, the first image pick-up portion and the second image pick-up portion capture an image in front of the earth-moving machine, an optical axis of the first image pick-up portion and an optical axis of the second image pick-up portion are inclined in a plan view away from the work implement with respect to the central axis in the lateral direction as a distance from the main body is greater toward a front of the earth-moving machine, the first image pick-up portion and the second image pick-up portion are arranged such that the optical axis of the first image pick-up portion and the optical axis of the second image pick-up portion intersect with each other in front of the main body, a range of image pick-up by the first image pick-up portion overlaps with a range of image pick-up by the second image pick-up portion, and the work implement is out of an angle of view of the image pick-up apparatus regardless of an attitude of the work implement.

4. The system for the earth moving machine according to claim 3, wherein an angle of inclination of the optical axis of the first image pick-up portion with respect to the central axis is smaller than an angle of inclination of the optical axis of the second image pick-up portion with respect to the central axis.

\* \* \* \* \*